United States Patent
Yang et al.

(10) Patent No.: US 12,500,853 B2
(45) Date of Patent: Dec. 16, 2025

(54) CORRECTION OF ESTIMATED UNIQUE COUNTS OF RESOURCE USERS

(71) Applicant: Tubular Labs, Inc., Mountain View, CA (US)

(72) Inventors: Chae-Reem Yang, Mountain View, CA (US); Benjamin Foley, Santa Clara, CA (US); Vera Dadok, Burlingame, CA (US)

(73) Assignee: Tubular Labs, Inc., Mountain View, CA (US)

( * ) Notice: Subject to any disclaimer, the term of this patent is extended or adjusted under 35 U.S.C. 154(b) by 39 days.

(21) Appl. No.: 18/525,247

(22) Filed: Nov. 30, 2023

(65) Prior Publication Data

US 2025/0184286 A1    Jun. 5, 2025

(51) Int. Cl.
*H04L 47/70* (2022.01)
*H04L 47/78* (2022.01)
*H04L 47/83* (2022.01)
*H04L 67/50* (2022.01)

(52) U.S. Cl.
CPC .......... *H04L 47/828* (2013.01); *H04L 47/782* (2013.01); *H04L 47/83* (2022.05); *H04L 67/535* (2022.05)

(58) Field of Classification Search
CPC ..... H04L 47/828; H04L 47/83; H04L 67/535; H04L 47/782
USPC ........................................ 709/223, 224, 226
See application file for complete search history.

(56) References Cited

U.S. PATENT DOCUMENTS

| | | | |
|---|---|---|---|
| 2007/0286071 A1* | 12/2007 | Cormode | H04L 43/16 370/229 |
| 2014/0236669 A1* | 8/2014 | Milton | G06Q 30/0201 705/7.29 |
| 2017/0004526 A1* | 1/2017 | Morovati | G06Q 30/0242 |
| 2017/0353855 A1* | 12/2017 | Joy | H04W 12/02 |
| 2019/0370860 A1* | 12/2019 | Morovati Lopez | H04N 21/6582 |

(Continued)

OTHER PUBLICATIONS

Boyd et al, "Convex Optimization: Chapter 4.3 Linear Optimization Problems" https://web.stanford.edu/~boyd/cvxbook/ Mar. 8, 2004.

(Continued)

*Primary Examiner* — Liang Che A Wang
(74) *Attorney, Agent, or Firm* — Van Pelt, Yi & James LLP

(57) ABSTRACT

Correction of estimated unique counts of resource users is disclosed, including: determining a set of shared resources between a first property and a second property, wherein the first property comprises a custom property comprising a configurable collection of two or more resources; recording a hidden node that corresponds to the set of shared resources; obtaining an estimated aggregate count of unique resource users corresponding to the first property; obtaining an estimated deduplicated count of unique resource users across the set of shared resources, wherein the estimated deduplicated count of unique resource users corresponds to the hidden node; determining minimum and maximum boundaries corresponding to the first property based on the estimated deduplicated count of unique resource users corresponding to the hidden node; and correcting the estimated aggregate count of unique resource users corresponding to the first property based on the minimum and maximum boundaries.

18 Claims, 17 Drawing Sheets

(56) References Cited

U.S. PATENT DOCUMENTS

2022/0277340 A1\* 9/2022 Sheppard ............ G06Q 30/0246
2023/0096891 A1\* 3/2023 Tucker ................. H04N 21/251
　　　　　　　　　　　　　　　　　　　　　　725/34
2023/0300412 A1\* 9/2023 Spoentgen ......... G06Q 30/0251
　　　　　　　　　　　　　　　　　　　　　　725/14

OTHER PUBLICATIONS

Wikipedia, "Maximal Independent Sets" https://en.wikipedia.org/wiki/Maximal_independent_set accessed Nov. 6, 2023.

\* cited by examiner

CORRECTION OF ESTIMATED UNIQUE COUNTS OF RESOURCE USERS

BACKGROUND OF THE INVENTION

The count of unique resource users for a particular resource may need to be estimated from a recorded set of activities that are performed by a sample of resource users. For example, the recorded set of activities may comprise events that resource users perform at various websites and that are recorded by the users' web browsers. Typically, the count of unique resource users is separately determined for individual resources from the recorded set of activities. However, as resources are arbitrarily grouped together to form sets of resources, the combination of the individually determined counts of unique resource users for each resource may not accurately reflect the actual count of unique resource users across the group due to the potential overlap of users that use two or more resources from the group.

BRIEF DESCRIPTION OF THE DRAWINGS

Various embodiments of the invention are disclosed in the following detailed description and the accompanying drawings.

DETAILED DESCRIPTION

Figure 1:
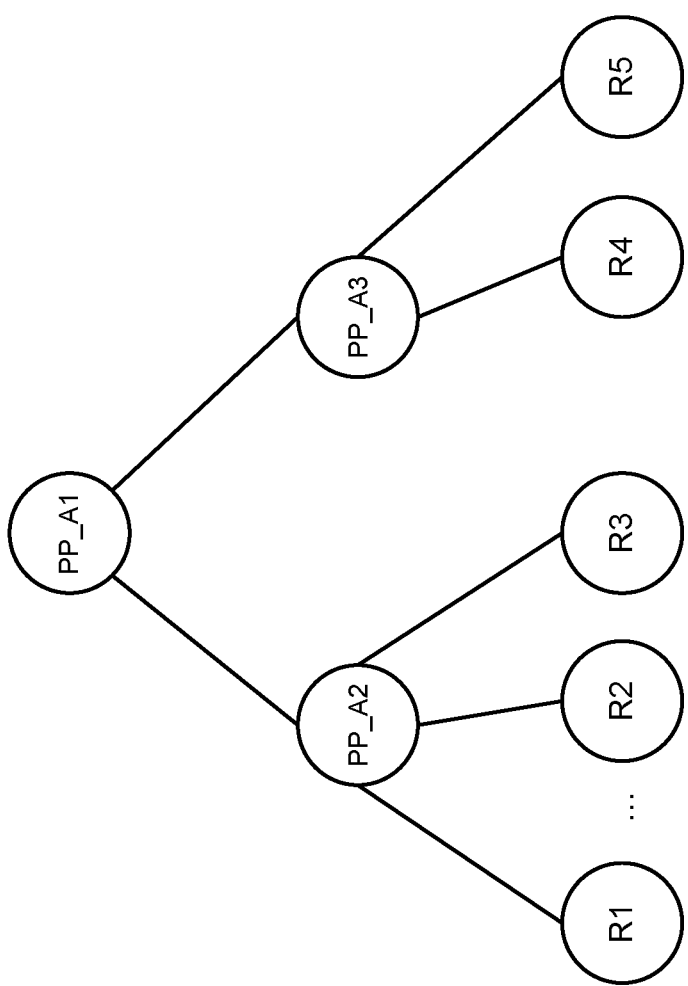
FIG. 1 is a diagram of an example production property in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of correction of estimated counts of unique resource users are described herein. A set of shared resources between a pair of properties including a first property and a second property is determined. In various embodiments, a "property" comprises a collection of resources. In various embodiments, a "property" may be a "production property" or a "custom property." A "production property" includes static resources and static relationships among the resources. A "custom property" includes a configurable and arbitrary set of resources. In various embodiments, the first property comprises a custom property while the second property can be either a production property or another custom property. A "set of shared resources" refers to the resources that are common to both of the first and second properties. A "hidden node" that corresponds to the set of shared resources is recorded. In various embodiments, the "hidden node" is a parent node to the shared set of resources in a hierarchical graph representation of at least the first and second properties. Put another way, the hidden node reflects the degree of overlap between the unique resource users across the shared set of resources. An estimated aggregate count of unique resource users corresponding to the first (custom) property is obtained. The estimated aggregate count of unique resource users is determined based on a sampling rate associated with one or more samples of recorded user activities. An estimated deduplicated count of unique resource users across the set of shared resources (corresponding to the hidden node) is obtained. As will be described in further detail below, the estimated aggregate count of unique resource users corresponding to the first (custom) property and the estimated deduplicated count of unique resource users corresponding to the hidden node may include error from the (respective) estimated sampling rate for each resource in the recorded user activities or the estimated sampling rate for the collection of resources in the first property, which may then be amplified by the arbitrary grouping of resources in at least the first (custom) property of the pair of properties. To maintain self-consistency on the estimated counts of unique resource users in each custom property, minimum and maximum composition boundaries corresponding to the first (custom) property are determined based at least in part on the estimated deduplicated count of unique resource users corresponding to the hidden node. The estimated aggregate count of unique resource users corresponding to the first property is corrected based at least in part on the minimum and maximum composition boundaries. As used herein, "uniques" is a shorthand for the "count of unique resource users" corresponding to a resource, a hidden node, or a property. An example of a "resource" includes a creator of media (e.g., a video channel creator on an online streaming platform) and an example of a "resource user" is an audience member that had interacted (e.g., viewed, commented on) with at least one piece of media (e.g., a video) of the resource (media creator).

Figure 2B:
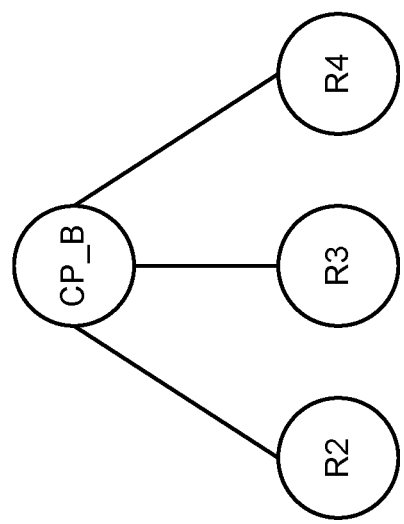
FIGS. 2A and 2B are diagrams of two example customer properties in accordance with some embodiments.
Figure 2A:
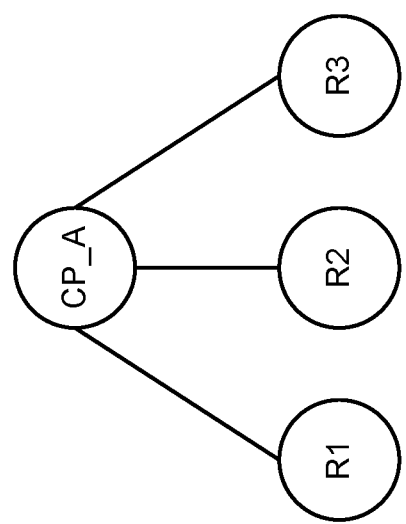

As mentioned above, the following terms are used herein:
  "Resource": A resource is a minimum unit within a definition of a production property or a custom property. A resource is an entity for which the count of its unique users ("resource users") is estimated from samples of recorded user activities. An example of a resource is a creator of media (e.g., a video channel creator on an online streaming platform).
  "Production property": A collection of two or more resources and where the relationships of the resources are defined in a hierarchy comprising a tree structure. The resources that are members to a production property are typically static. Unlike a custom property, a production property must have a tree structure. Furthermore, a production property is defined to have zero hidden nodes. For example, resources of a production property may correspond to resources that are owned or managed by a common proprietor. FIG. 1 is a diagram of an example production property in accordance with some embodiments. As shown in FIG. 1, Production Property PP_A1 includes two child Production Properties, PP_A2 and PP_A3. Production Property PP_A2 includes child leaf nodes ("leaf nodes" are nodes without children of their own), which are resources, including R1, . . . , R2, and R3. Production Property PP_A3 includes child nodes, which are resources, including R4 and R5. As shown in the example of FIG. 1, production properties, such as PP_A2 and PP_A3, do not share any common resources and are unlikely to be modified to share resources with another Production Property.
  "Custom property" (which can also be referred to as "custom group"): A collection of two or more resources and where the relationship of the resources are defined in an arbitrary graph structure. Unlike in a production property, a custom property may be a tree structure or a non-tree structure. Also, unlike in a production property, the resources that are members to a custom property can be dynamically added or removed. Put another way, new custom properties can be created and existing custom properties can be modified or deleted after their creation. An example use case of adding or removing a resource to or from a custom property is to project the change in the estimated aggregate count of unique resource users across the entire custom property after the addition/removal of the resource. For example, if a resource were a video creator, then a custom property that corresponds to a collection of video creators that are managed by the same entity can be modified to include a new video creator to determine the updated/resulting estimated aggregate count of unique resource users if the new video channel/video creator were hypothetically added under the management of the same entity (e.g., proprietor). A custom property may also be nested within another custom property. A production property may also be nested within a custom property. FIGS. 2A and 2B are diagrams of two example custom properties in accordance with some embodiments. Custom Property CP_A has been defined to include resources R1, R2, and R3. Custom Property CP_B has been defined to include resources R2, R3, and R4. As shown in FIGS. 2A and 2B, custom properties, such as CP_A and CP_B, can be defined to include common resources (resources R2 and R3 in the case of CP_A and CP_B). What is more, custom properties can be dynamically modified over time to include new resources, remove existing resources, and/or include previously defined custom properties (meaning that custom properties can be nested within one another).

The conventional technique of inferring the count of unique resource users from the sample of users whose (e.g., online/web browser) activity data is recorded in a set of panel data for the group of arbitrary resources of a custom property may or may not lead to not credible aggregate unique counts (e.g., aggregate unique counts that are significantly greater or less than the sum of the respective counts of resource users for the member resources of the custom property). A set of panel data comprises recorded activities from a sample of users, which are also called "panelists." These errors in the estimation of aggregated counts of unique resource users across the group of arbitrary resources of a custom property are partly due to errors associated with the sample(s) of users for which activity data is captured in the set of panel data, which could include the relative underrepresentation or overrepresentation of users in the panel data for each resource. The nonsensical aggregate/combined unique counts across an arbitrary collection of two or more resources in a custom property may also be partly due to errors associated with how the aggregated counts of unique resource users across the group of arbitrary resources of a custom property are estimated.

The following is an example conventional technique for estimating the aggregated counts of unique resource users across the group of arbitrary resources of a custom property:

The estimated resource-specific counts of unique resource users have been determined from two samples/sets of panel data (recorded user activity data) for the following three resources:

Resource 1: 0.1 million ("0.1M") uniques. (Assume that this set of unique resource users is determined from a first sample/data panel with a size of 1,000 panelists. Also, assume that the 0.1M uniques for Resource 1 is determined from the first sample based on a first estimated sampling rate. This first estimated "sampling rate" is the estimated proportion of the total population that uses Resource 1 that is included in this first sample of 1,000 panelists.)

Resource 2: 0.1M uniques (Assume that this set of unique resource users is also determined from the first sample/data panel with the size of 1,000 panelists. Also, assume that the 0.1M uniques for Resource 2 is determined from the first sample based on a second estimated sampling rate. This second estimated "sampling rate" is the estimated proportion of the total population that uses Resource 2 that is included in this first sample of 1,000 panelists.)

Resource 3: 1M uniques (Assume that this set of unique resource users is completely disjoint from the resource users of Resource 1 and Resource 2. Also, assume that the uniques for Resource 3 is determined from a second sample with a size of 500 panelists. Also, assume that the 1M uniques for Resource 3 is determined from the second sample based on a third estimated sampling rate. This third estimated "sampling rate" is the estimated proportion of the total population that uses Resource 3 that is included in this second sample of 500 panelists.

Custom Property A includes three resources (Resource 1, Resource 2, and Resource 3). In the example described below, the aggregated count of unique resource users across Resource 1, Resource 2, and Resource 3 of Custom Property A is estimated based on an estimated sampling rate that is associated with Custom Property A (hereinafter "sampling rate") as described below using the following formula:

$$\text{Estimated aggregate count of unique resource users in Custom Property A} = \text{(Total panelists after deduplication)}/(\text{sampling\_rate}) \quad (1)$$

Sampling_rate associated with Custom Property A could be computed in a number of ways and represents an estimated proportion of the total population that uses Resources 1, 2, and/or 3 and is included in the first and second samples. For example, one could have a global sampling rate, or a sampling rate per country, or an estimated sampling rate of a particular custom property based on the resource-specific counts and sample sizes. In this example, let's say we have estimated a sampling_rate of 1/500=0.002.

In this case the "Total panelists after deduplication" for Custom Property A=(1,000 for Resources 1, 2 which are fully overlapped+500 for Resource 3 that is fully disjoint)=1500.

Overall, this process yields an estimated aggregate count of unique resource users in Custom Property A of (Total panelists after deduplication)/(sampling_rate) (1500)/(0.002)=750,000 (or 0.75M).

However, as shown in the illustrative example above, given the sample sizes of panelists, the error associated with the estimation of sampling rate corresponding to Custom Property A, and/or the estimated uniques of users for each specific resource, the estimated aggregated uniques across the three resources of Custom Property A (0.75M) is significantly smaller than the intuitive aggregate minimum (≥1.0M) of the three resources, as Resource 3 itself is at least 1M uniques. The inaccuracy of the estimated aggregated uniques across the three resources of Custom Property A (0.75M) as determined in the conventional technique described above is, at least in part, due to the error associated with the estimation of sampling rate corresponding to Custom Property A. The error of the estimated sampling rate corresponding to Custom Property A is due to the estimated sampling rate's deviation from the true sampling rate, which is unknown. For example, the estimated sampling rate corresponding to Custom Property A could be based on the respective sampling rates corresponding to each of Resources 1, 2, and 3 that are part of Custom Property A, the attributes (e.g., size, demographics) of the first and second samples from which the estimated aggregate count of unique resource users corresponding to the first property is determined, and/or the estimated resource-specific count of unique resource users for each of Resources 1, 2, and 3 that are part of Custom Property A.

Embodiments described herein provide a correction to conventional estimations of aggregated counts of unique resource users across two or more resources in a custom property, such as described in the example above.

Figure 3:
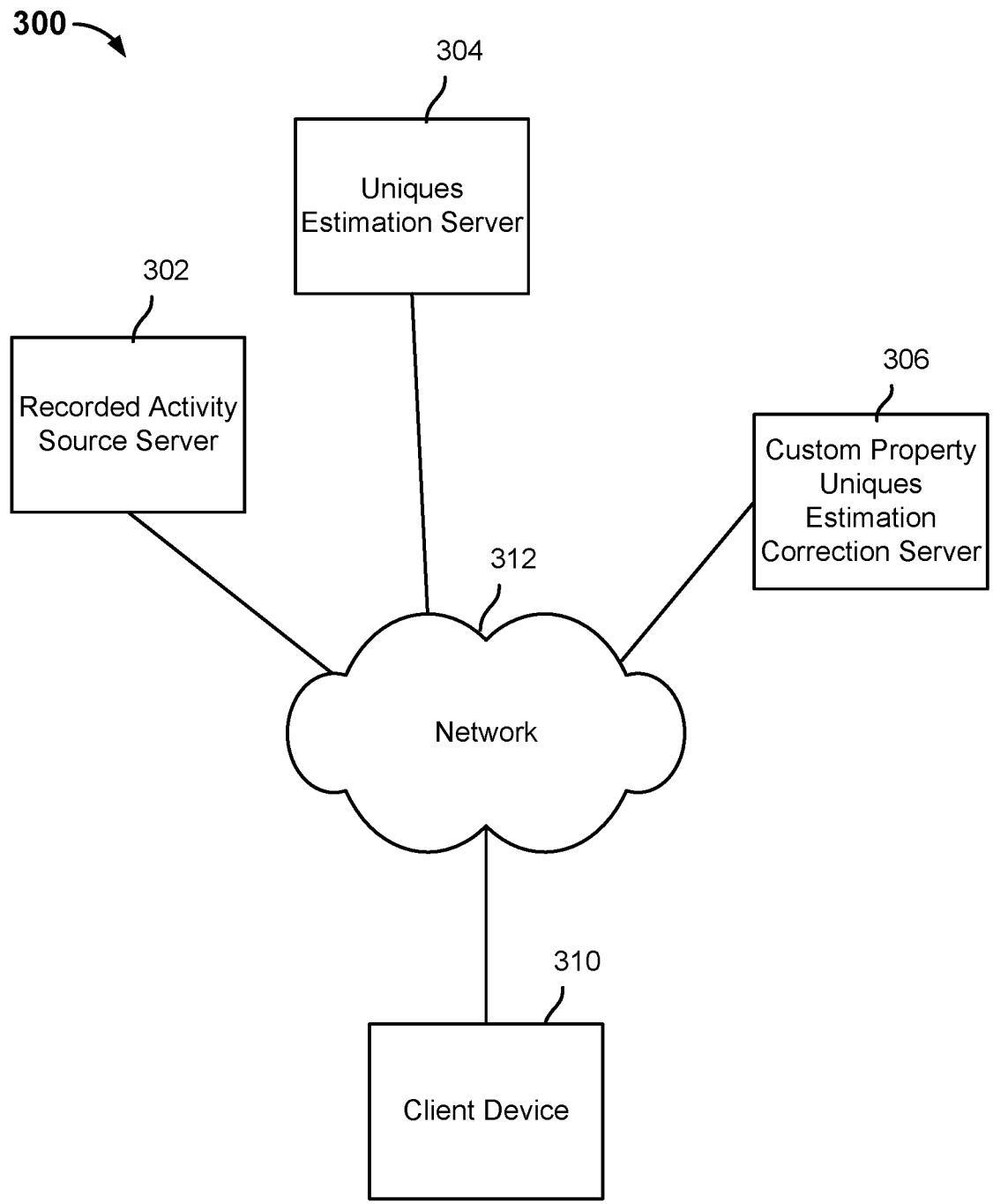
FIG. 3 is a diagram showing an embodiment of a system for correction of estimated counts of unique resource users.

FIG. 3 is a diagram showing an embodiment of a system for correction of estimated counts of unique resource users. As shown in FIG. 3, system 300 includes recorded activity source server 302, uniques estimation server 304, custom property uniques estimation correction server 306, network 312, and client device 310. Each of recorded activity source server 302, uniques estimation server 304, custom property uniques estimation correction server 306, and client device 310 can communicate to each other over network 312. Network 312 comprises data and/or telecommunications networks.

Uniques estimation server 304 is configured to obtain sets of recorded user online activity data from recorded activity source server 302. In some embodiments, uniques estimation server 304 is configured to obtain a new set of recorded user online activity data from recorded activity source server 302 at regular intervals (e.g., weekly). In some embodiments, a set of recorded user online activity data provided by recorded activity source server 302 comprises clickstream data, which comprises recorded clicks/selections/viewing of media (e.g., videos) at various websites by users who have opted in to having their online activities recorded (e.g., by a plug-in in a web browser). In various embodiments, a set of recorded user online activity is referred to as a "sample" or a set of "panel data." In various embodiments, a user whose activities are recorded within the set of recorded user online activity data is referred to as a "panelist" and is also uniquely represented by a corresponding "panelist identifier (ID)" in the set of panel data. In some embodiments, each recorded user online activity includes at least the following pieces of information: a panelist ID of the user that had performed the activity and the uniform resource locator (URL) associated with the visited webpage. In some embodiments, a relevant resource may be specified in a recorded activity and in some other embodiments, the resource that is relevant to the recorded activity can be inferred from the URL associated with that activity. In a specific example, a resource relevant to a recorded activity may comprise a video channel or a video creator on an online streamlining platform and the recorded activity may involve a corresponding panelist ("resource user") viewing or commenting on a video that is associated with that video channel/creator.

Uniques estimation server 304 is configured to estimate the corresponding count of unique resource users corresponding to each individual resource based on a set of panel data (e.g., that was obtained from recorded activity source server 302). In some embodiments, uniques estimation server 304 is configured to use the resource-specific estimated count of unique resource users that was previously determined for each resource that is included in a production property that includes two or more resources to determine an estimated aggregate count of unique resource users across the production property. Similarly, uniques estimation server 304 is configured to use the resource-specific estimated count of unique resource users that was previously determined for each resource that is included in a custom property that includes two or more resources to determine an estimated aggregate count of unique resource users across the custom property. Uniques estimation server 304 is further configured to use the resource-specific estimated count of unique resource users that was previously determined for each resource that is included in a set of shared resources corresponding to a "hidden node" (which is also sometimes referred to as a "hidden property," as will be described in further detail below), across a pair of properties (at least one of which is a custom property) to determine an estimated deduplicated count of unique resource users across the set of shared resources. As will be described below, these estimated counts of unique resource users corresponding to (e.g., custom) properties and hidden nodes (that are determined between pairs of properties) can be corrected based on the composition (e.g., minimum and maximum) boundaries that are determined by custom property uniques estimation correction server 306.

Custom property uniques estimation correction server 306 is configured to maintain the compositions/definitions of properties such as production properties and custom properties. Given the arbitrary and dynamically reconfigurable collection of resources of a custom property, constraints for a custom property are not as clean or well-defined as they may be for production productions, for which uniques constraints are easier to enforce due to their pure tree structures. As such, custom property uniques estimation correction server 306 is configured to perform graph-based composition capping (correction) of the estimated count of unique resource users (e.g., as obtained at an interface from uniques estimation server 304) corresponding to custom properties and hidden nodes corresponding to resources that are shared by a custom property and another property (another custom property or a production property). As will be described in further detail below, in various embodiments, custom property uniques estimation correction server 306 is configured to perform graph-based composition capping (correction) of the estimated count of unique resource users by performing pairwise comparisons of properties (e.g., from a particular set of properties, such as a set defined by the same customer) to determine pairs that share common resources. For pairs of properties that share (common) resources, a respective hidden node is recorded corresponding to the set of shared resources between each pair. Custom property uniques estimation correction server 306 is configured to generate bipartite graphs for pairs of properties with determined hidden properties, where each custom property, production property, hidden property, and resource of a property is a respective node in a graph. From the bipartite graphs (graphs with two layers), custom property uniques estimation correction server 306 may generate hierarchical graphs (graphs with three or more layers) that show the relationships among custom property nodes, production property nodes, hidden nodes, and the resource nodes. Custom property uniques estimation correction server 306 is configured to query uniques estimation server 304 to obtain the estimated counts of unique resource users corresponding to each node in each hierarchical graph. Then, custom property uniques estimation correction server 306 is configured to determine composition boundaries comprising a composition minimum and a composition maximum corresponding to the hidden node(s) and custom propert(ies) in each hierarchical graph based on the estimated counts of unique resource users corresponding to their child/descendent property nodes and resource nodes in that graph. Custom property uniques estimation correction server 306 is configured to compare the queried estimated counts of unique resource users corresponding to a custom property and a hidden node in a hierarchical graph to their respective composition boundaries and if the queried estimated count is outside of the composition boundaries, custom property uniques estimation correction server 306 is configured to correct the queried estimated count to be within the composition boundaries.

By performing such corrections of estimated counts of unique resource users, the corrected estimated counts corresponding to custom properties and hidden nodes in a hierarchical graph are to become self-consistent (e.g., within the determined composition boundary constraints) within the graph. Put another way, the determined composition boundaries for nodes in a hierarchical graph take into account the presence of overlapping unique resource users between resources that are common to two or more properties and serve as guardrails on the estimated uniques corresponding non-leaf nodes of the graph. As such, in response to a query of an estimated count of unique resource users from a requestor, custom property uniques estimation correction server 306 is configured to return a corrected estimate, if any, to ensure an accurate response. In some embodiments, custom property uniques estimation correction server 306 is configured to perform graph-based composition capping (correction) of the estimated count of unique resource users, as described herein, on a periodic interval (e.g., monthly). Put another way, any newly created custom properties or updated definitions of custom properties will be accounted for in the subsequent performance of the graph-based composition capping (correction) of the estimated count of unique resource users.

Figure 4:
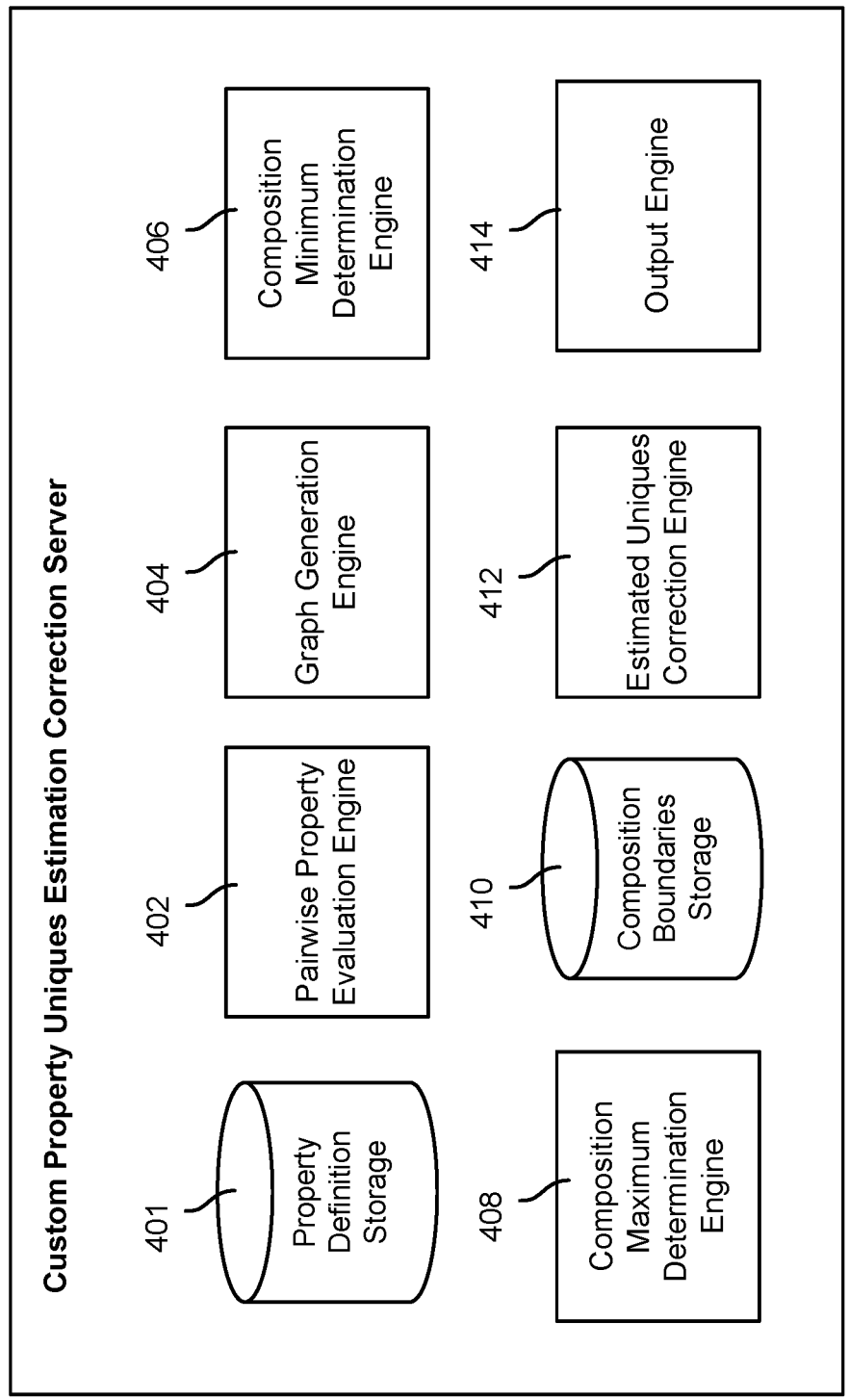
FIG. 4 is a diagram showing an example of a custom property uniques estimation correction server.

FIG. 4 is a diagram showing an example of a custom property uniques estimation correction server. In some embodiments, custom property uniques estimation correction server 306 of system 300 of FIG. 3 may be implemented using the example shown in FIG. 4. In FIG. 4, the example custom property uniques estimation correction server includes property definition storage 401, pairwise property evaluation engine 402, graph generation engine 404, composition minimum determination engine 406, composition maximum determination engine 408, composition boundaries storage 410, estimated uniques correction engine 412, and output engine 414. Each of property definition storage 401, pairwise property evaluation engine 402, graph generation engine 404, composition minimum determination engine 406, composition maximum determination engine 408, composition boundaries storage 410, estimated uniques correction engine 412, and output engine 414 may be implemented using a combination of hardware and/or software.

Property definition storage 401 is configured to store definitions of properties. In various embodiments, property definition storage 401 stores sets of properties corresponding to (e.g., that have been defined by) respective customers. In various embodiments, property definition storage 401 stores definitions of custom properties and production properties. As described above, the definition of a production property comprises a tree structure of nodes, where the leaf nodes correspond to resources that belong to the production property. Also as described above, the definition of a custom property comprises a collection of nodes, where the leaf nodes correspond to resources that belong to the custom property. In various embodiments, the definition of a custom property can be dynamically updated to add new resource leaf nodes, remove existing resource leaf nodes, and/or to include another defined custom property. As mentioned above, a custom property's definition may include a resource that is also included in the definition of a production property or another custom property.

Pairwise property evaluation engine 402 is configured to compare the definitions of pairs of properties (e.g., that belong to the same customer) to determine whether the pair shares at least two resources, which may be associated with a hidden node. As mentioned above, the hidden node reflects the degree of overlap between the unique resource users across the shared set of resources. In various embodiments, pairwise property evaluation engine 402 is configured to compare pairs including two custom properties or pairs including one custom property and one production property. For example, pairwise property evaluation engine 402 determines whether a pair of properties shares resources by determining the "pairwise overlap weight," which is the fraction of common resources by minimum of both properties. If the pairwise overlap weight were zero, then the pair of properties do not share any resources and therefore, no hidden nodes will be recorded between the pair of properties. If the pairwise overlap weight were one, then the pair of properties are completely overlapped (i.e., all of the resources of one property are shared with the other property in the pair) and therefore, no hidden nodes will be recorded between the pair of properties. Otherwise, if the pairwise overlap weight were above zero and below one, then pairwise property evaluation engine 402 is configured to record a hidden node that corresponds to the shared subset of resources between the two properties. Conceptually, the estimated deduplicated count of unique resource users corresponding to a hidden node is reflective of the degree of overlapping unique resource users among the shared resources between two properties, and this degree of overlap is to remain consistent in the potential correction of the estimated counts of unique resource users corresponding to the estimated aggregate counts of unique resource users corresponding to each property in the pair.

Graph generation engine 404 is configured to generate graphs corresponding to the pairs of properties that were determined (e.g., by pairwise property evaluation engine 402) to share at least one resource. In various embodiments, graph generation engine 404 is configured to first generate a bipartite graph corresponding to each pair of properties that share at least one resource. A bipartite graph includes two layers, where the top layer includes respective nodes that correspond to the pair of properties as well as the hidden node, if any, and the lower layer comprises respective nodes that correspond to resources across the pair of the properties. The bipartite graph also includes edges from each property to its child/resource leaf nodes and edges from the hidden nodes to the resources that are shared by the pair of compared properties. In various embodiments, graph generation engine 404 is configured to convert each generated bipartite graph corresponding to each pair of properties to a hierarchical graph. Unlike a bipartite graph, a hierarchical graph has N (where N≥3) layers, where the top layer includes respective nodes that correspond to the pair of properties, the middle layer(s) comprise the hidden node and also non-hidden node propert(ies), and the bottom layer comprises leaf nodes that correspond to the resources across the pair of properties in the top layer and/or middle layer(s). The hierarchical graph also includes edges from each top layer property and/or middle layer property to its non-shared resource leaf nodes, and edges from the hidden node to the resources that are shared by the pair of compared properties. A special case of the hierarchical graph is one in which the pair of properties completely overlap and in which case the superset property corresponds to a node in the top layer, the other entirely nested property corresponds to a node in a middle layer, and the bottom layer comprises leaf nodes that correspond to the resources across the pair of properties in the top layer. In this special case, there are edges from the superset property node of the top layer to the other entirely nested property node in the middle layer, edges from the superset property node of the top layer to its non-shared resource leaf nodes in the bottom layer, and edges from the entirely nested property node in the middle layer to the shared resource leaf nodes in the bottom layer. Graph generation engine 404 is further configured to query a uniques estimation server (e.g., uniques estimation server 304 of system 300 of FIG. 3) for the estimated count of unique resource users (which are sometimes referred to as simply "uniques") corresponding to each node (e.g., resource leaf node, custom property node, production property node, and/or hidden node) of each hierarchical graph. As will be described in further detail below, the relationships between the nodes as described in each hierarchical graph are to be used to determine composition boundaries (minima and maxima) corresponding to each node whose obtained estimated count of unique resource users is adjustable/correctable, such as the estimated aggregate count of unique resource users of custom properties in the top layer and the estimated deduplicated count of unique resource users of hidden nodes in the middle layer.

Composition minimum determination engine 406 is configured to determine a composition minimum boundary (value) for a non-leaf node within each hierarchical graph. In various embodiments, composition minimum determination engine 406 is configured to determine a composition minimum boundary (value) for each hidden node and custom property node within the hierarchical graph. In general, the composition minimum of a hidden node or a custom property node is determined from all constraints defined by its child entities (e.g., hidden nodes, child property nodes, leaf resource nodes) from the lower graph layers. In some embodiments such as when the counts of unique resource users associated with production properties are fixed (i.e., not corrected through compositional capping), the composition minimum of a hidden node or a custom property node may also be determined from constraints that are defined by one or more of their parent entities. The composition minimum describes a case where the unique resource users of the children resource leaf nodes that depend from a hidden node are fully overlapped and that therefore, the composition minimum of their immediate parent node cannot be less than the greatest of their respective unique resource users. As such, composition minimum determination engine 406 is configured to determine the composition minimum for each hidden node and custom property node within the hierarchical graph as the maximum of the counts of unique resource users of its child entities (e.g., hidden nodes, child property nodes, leaf resource nodes) in lower graph layers.

Composition maximum determination engine 408 is configured to determine a composition maximum boundary (value) for a non-leaf node within each hierarchical graph. In various embodiments, composition maximum determination engine 408 is configured to determine a composition maximum boundary (value) for each hidden node and custom property node within the hierarchical graph. In general, the composition maximum of a hidden node or a custom property node is determined from all constraints defined by child entities (e.g., hidden nodes, child property nodes, leaf resource nodes) from the lower graph layers. In some embodiments such as when the counts of unique resource users associated with production properties are fixed (i.e., not corrected through compositional capping), the composition maximum of a hidden node or a custom property node may also be determined from constraints that are defined by one or more of their parent entities. The composition maximum describes a case where the unique resource users of the children resource leaf nodes that depend from a hidden node are fully disjoint (i.e., have no overlap) and that therefore, the composition maximum of their parent node cannot be greater than the sum of their respective unique resource users. As such, composition maximum determination engine 408 is configured to first determine all the disjoint sets corresponding to each hidden node and custom property node within the hierarchical graph. A disjoint set comprises the largest sets of non-overlapping nodes that entirely cover the same leaf resource nodes that descend from the hidden node or the custom property node. Then, composition maximum determination engine 408 is configured to determine the sum of the estimated count of unique resource users corresponding to all the nodes within each disjoint set ("disjoint sum") and assign the minimum of such disjoint sums as the composition maximum of the hidden node or custom property node in question.

Composition boundaries storage 410 is configured to store composition boundaries that have been determined by (e.g., composition minimum determination engine 406 and composition maximum determination engine 408, respectively) corresponding to non-leaf nodes, such as hidden nodes and custom property nodes in each hierarchical graph (e.g., that was generated by graph generation engine 404). In some embodiments, composition boundaries are precise numbers. In some embodiments, composition boundaries may not be fixed to precise numbers, but could be the mathematical representation of the boundary relationships. For example, the compositional minimum could be the number 1 million, or it could be represented as minimum (Custom_PropertyA, Custom_Property B, Resource1, Resource2, etc.). Such a function-based representation is meaningful because when compositional capping is applied to, for example, Custom Property A, the corrected count of unique resource users of Custom Property A may in turn affect the composition boundaries of another custom property. The propagation of corrected counts of unique resource users may therefore require coordination among composition minimum determination engine 406, composition maximum determination engine 408, composition boundaries storage 410, and/or estimated uniques correction engine 412.

Estimated uniques correction engine 412 is configured to compare the composition boundaries that have been determined for the non-leaf nodes (e.g., hidden nodes and custom property nodes) in each hierarchical graph to the non-leaf node's obtained/queried estimated count of unique resource users and then potentially correct the non-leaf node's obtained/queried estimated count of unique resource users based on the comparison. In various embodiments, estimated uniques correction engine 412 is configured to determine whether each hidden node's and each custom property node's estimated count of unique resource users is less than the node's composition minimum and if so, correct the estimated count of unique resource users based on (e.g., to match or to be greater than) the composition minimum. Also, in various embodiments, estimated uniques correction engine 412 is configured to determine whether each hidden node's and each custom property node's estimated count of unique resource users is greater than the node's composition maximum and if so, correct the estimated count of unique resource users based on (e.g., to match or to be less than) the composition maximum.

In some embodiments, linear programming is used to perform composition boundaries enforcement as described herein, in which the estimated count of unique resource users of resource leaf nodes and production property nodes is fixed (frozen constraints) by design. Additional constraints to be used in linear programming are that the estimated count of unique resource users of custom property nodes and hidden nodes is correctable (e.g., adjustable) and that such estimated count of unique resource users has to be within the nodes' respective composition boundaries (e.g., composition minima and composition maxima). As such, linear programming can be leveraged to efficiently determine composition boundaries of each custom property node and hidden node. Furthermore, linear programming can also simultaneously correct (adjust) the estimated count of unique resource users of custom property nodes and hidden nodes to satisfy the constraints described above.

Output engine 414 is configured to receive queries for the estimated count of unique resource users corresponding to a property (e.g., for which a definition is stored at property definition storage 401). In response to the query, output engine 414 is configured to determine whether a corrected version of the estimated count of unique resource users has been determined (e.g., by estimated uniques correction engine 412) and if so, return the corrected estimated count of unique resource users for the specified property. Otherwise, if output engine 414 determines that a corrected version of the estimated count of unique resource users does not exist (e.g., because the estimated count of unique resource users obtained for that property did not have to be or was not permitted to be corrected by estimated uniques correction engine 412), then output engine 414 is configured to return the estimated count of unique resource users for the specified property. For example, if the estimated count of unique resource users was requested for a custom property, then output engine 414 would first determine whether the custom property's uniques were corrected (e.g., by estimated uniques correction engine 412) and if so, return the custom property's corrected estimated uniques.

Figure 5:
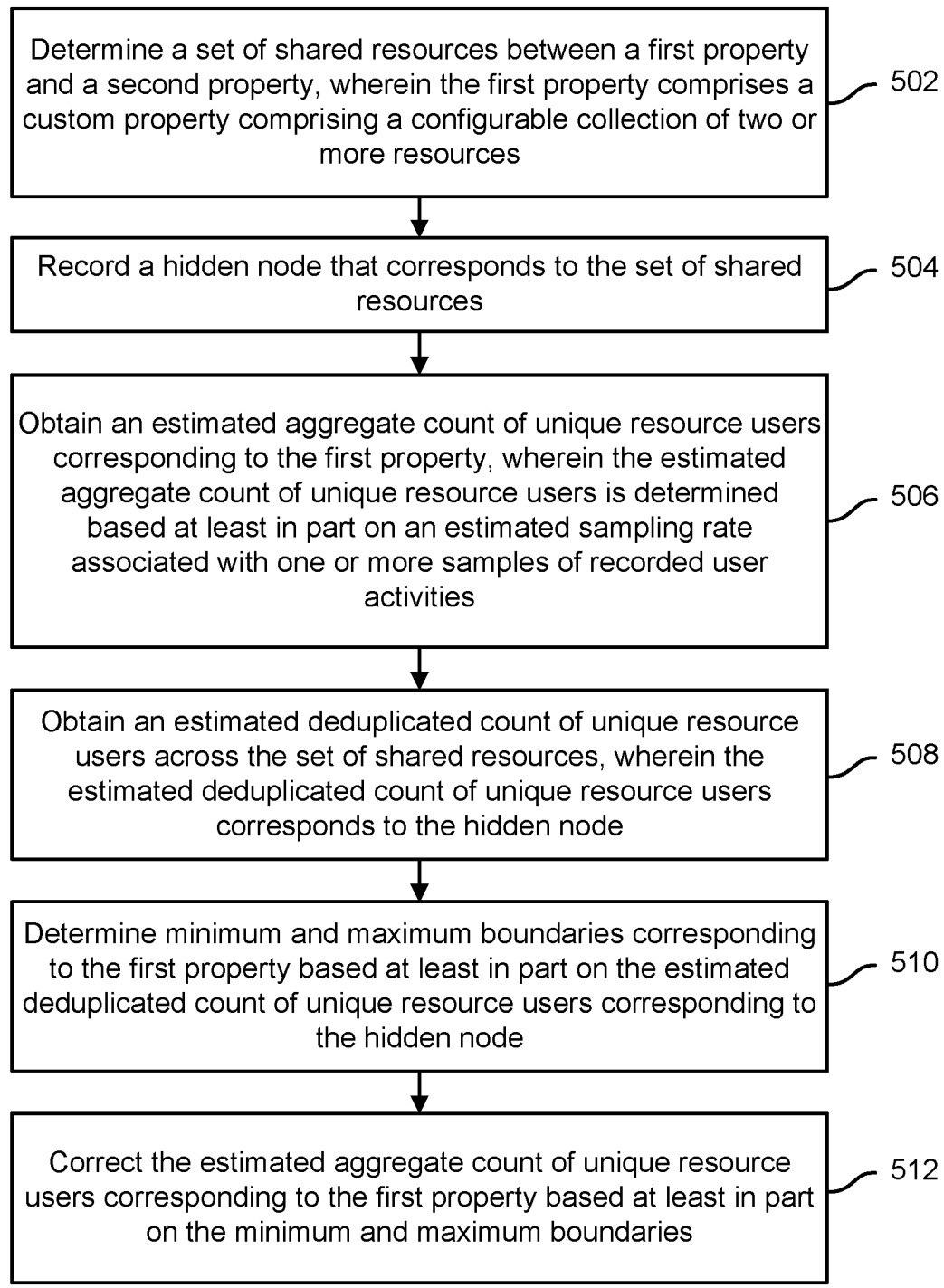
FIG. 5 is a flow diagram showing an embodiment of a process for correcting estimated counts of unique resource users.

FIG. 5 is a flow diagram showing an embodiment of a process for correcting estimated counts of unique resource users. In some embodiments, process 500 is implemented at least in part by custom property uniques estimation correction server 306 of system 300 of FIG. 3.

At 502, a set of shared resources is determined between a first property and a second property, wherein the first property comprises a custom property comprising a configurable collection of two or more resources. The resources that are included in the definition of a first, custom property are compared to the resources that are included in the definition of a second property, which may be another custom property or a production property, to determine the number of resources that are common to/shared by the pair of properties.

At 504, a hidden node that corresponds to the set of shared resources is recorded. If the two properties share at least one resource but do not fully overlap (i.e., the resources of one property fully include all the resources of the other property), then a hidden node corresponding to the shared resource(s) is recorded. The common two or more resources between the pair of properties indicates a possibility of overlap in the number of unique resource users across the shared resource(s), which should constrain the estimated aggregate count of unique resource users for either of the properties in the pair. In various embodiments, a hierarchical graph that represents at least the pair of properties as top layer nodes, the hidden node in middle layer(s), and the two properties' resources as leaf nodes in the bottom layer is generated. In this hierarchical graph, the hidden node is a parent node to shared resource(s) and each of the top layer property nodes are shown to be parents to the non-shared resources and other non-shared subproperties.

At 506, an estimated aggregate count of unique resource users corresponding to the first property is obtained, wherein the estimated aggregate count of unique resource users is determined based at least in part on an estimated sampling rate associated with one or more samples of recorded user activities. In some embodiments, the estimated aggregate count of unique resource users corresponding to the first (custom) property is determined based on an estimated sampling rate associated with determining the estimated aggregate count of unique resource users corresponding to the first property, as described above. For example, the estimated sampling rate corresponding to the first property may be determined based on the respective sampling rates corresponding to each resource that is part of the first property, the attributes (e.g., size, demographics) of the one or more samples of recorded user activity from which the estimated aggregate count of unique resource users corresponding to the first property is determined, and/or the estimated resource-specific count of unique resource users for each resource that is part of the first property. For example, a sample of recorded user activity comprises a sample of users' recorded online activity.

In some other embodiments, the estimated aggregate count of unique resource users corresponding to the first (custom) property is determined based on each resource's respective estimated count of unique resource users. Each resource's respective estimated count of unique resource users can be determined from one or more samples of recorded user activities and a respective estimated sampling rate.

As such, one or both of the estimated sampling rate corresponding to the first (custom) property and/or the respective sampling rates corresponding to the constituent resources of the first (custom) property could introduce error in the estimation of the aggregate count of unique resource users corresponding to the first (custom) property. This estimated aggregate count of unique resource users corresponding to the first (custom) property may then be corrected at step 512, as described below.

At 508, an estimated deduplicated count of unique resource users across the set of shared resources is obtained, wherein the estimated deduplicated count of unique resource users corresponds to the hidden node. In some embodiments, the estimated deduplicated count of unique resource users corresponding to the first (custom) property is determined based on each shared resource's respective estimated count of unique resource users that is determined from one or more samples comprising users' recorded user activity. In some embodiments, the estimated deduplicated count of unique resource users corresponding to the first (custom) property is determined based on evaluating the panelists across the one or more samples from which the estimated aggregate count of unique resource users corresponding to the first property is determined. In some other embodiments, estimated deduplicated count of unique resource users are not determined for hidden nodes at all.

In addition to the estimated aggregate count of unique resource users corresponding to the first property node and the estimated deduplicated count of unique resource users corresponding to the hidden node, the hierarchical graph is also populated with the respective estimated count of unique resource users that correspond to each resource leaf node.

At 510, minimum and maximum boundaries corresponding to the first property are determined based at least in part on the estimated deduplicated count of unique resource users corresponding to the hidden node. The composition boundaries comprising minimum and maximum boundaries corresponding to the first (custom) property are determined based on the estimated counts of unique resource users that correspond to child nodes (nodes that descend from the custom property, including the hidden node) of the custom property in the hierarchical graph.

At 512, the estimated aggregate count of unique resource users corresponding to the first property is corrected based at least in part on the minimum and maximum boundaries. The previously obtained estimated aggregate count of unique resource users corresponding to the first (custom) property is compared to its determined minimum and maximum boundaries and corrected if the estimated aggregate count is less than the minimum or greater than the maximum. For example, the estimated aggregate count is corrected/adjusted to match the minimum, the maximum, or within the range defined by the minimum and the maximum. The corrected estimated aggregated count will therefore be self-consistent with the estimated counts of unique resource users corresponding to its child nodes within the hierarchical graph.

Figure 6:
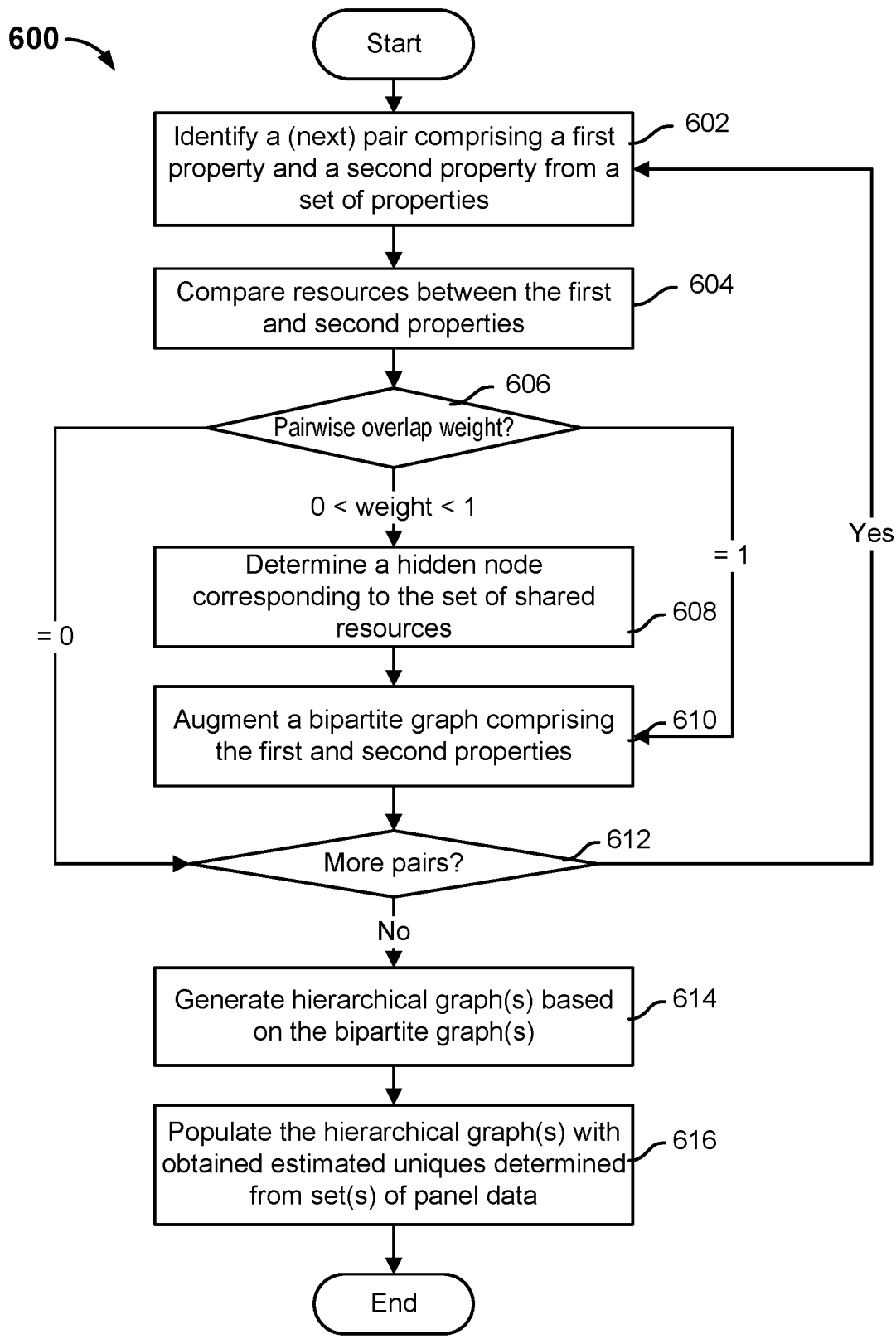
FIG. 6 is a flow diagram showing an example of determining hidden nodes between pairs of properties and generating hierarchical graphs based on the relationship among properties in accordance with some embodiments.

FIG. 6 is a flow diagram showing an example of determining hidden nodes between pairs of properties and generating hierarchical graphs based on the relationship among properties in accordance with some embodiments. In some embodiments, process 600 is implemented at least in part by custom property uniques estimation correction server 306 of system 300 of FIG. 3. In some embodiments, steps 502, 504, 506, and 508 of process 500 of FIG. 5 may be implemented, at least in part, using process 600.

At 602, a (next) pair comprising a first property and a second property from a set of properties is identified. For example, the set of properties belongs to an entity that had defined the properties in the set. In various embodiments, the pair of properties includes at least one custom property. Put another way, the pair of properties may include two custom properties or one custom property and one production property.

At 604, resources between the first and second properties are compared. The resources of the first property are compared to those of the second property to determine which resources overlap (i.e., are common to both properties), if any. In some embodiments, the pairwise overlap weight that represents the degree of resource overlap between the two properties can be represented as follows:

$$\text{(Count of shared resources in the two properties)}/ \text{(Count of resources within the smaller of the two properties)} \quad (3)$$

At 606, a pairwise overlap weight is determined based on the comparison. In the event that the pairwise overlap weight is zero, then control is transferred to 612. In the event that the pairwise overlap weight is 1, then control is transferred to 610. In the event that the pairwise overlap weight is greater than zero and less than one, then control is transferred to 608. Where pairwise overlap weight is zero, then the pair of properties have no common resource. When there is no common resource, no hidden node is to be recorded, no relationship between the properties exists, and a next pair of properties are to be compared. Where pairwise overlap weight is 1, then the pair of properties have fully overlapped, meaning that one property includes a superset of all the resources of the other property. Where pairwise overlap weight is greater than zero but less than one, then the pair of properties share common resource(s) and a hidden node is to be recorded corresponding to the shared resources.

At 608, a hidden node corresponding to the set of shared resources is determined.

At 610, a bipartite graph comprising the first and second properties is augmented. The bipartite graph comprising the first and second properties represents the properties as nodes in the top of two layers and the resources of each property node as child nodes in the bottom layer. Where there is a recorded hidden node, in the bipartite graph, the hidden node is shown to be a node in the top layer with the shared resources as its child, leaf nodes in the bottom layer. Where there is full overlap between the properties, the bipartite graph does not include a hidden node.

At 612, whether there is at least one more pair of properties to compare is determined. In the event that there is at least one more pair of properties to compare, control is returned to 602. Otherwise, in the event that there are no more pairs of properties to compare, control proceeds to 614.

At 614, hierarchical graph(s) are generated based on the bipartite graph(s). Each bipartite graph associated with a pair of properties is each converted into a respective three or more layered hierarchical graphs. In general, a hierarchical graph shows the relationships among the resources of the compared properties. If there is not full overlap but shared resources between a pair of properties (and therefore a hidden node), then its hierarchical graph represents the properties as nodes in the top layer and the resources of each property node as child nodes in the bottom layer. Any non-resource subproperties of each top layer property node can be represented as child nodes to the top layer property node in one or more middle layers. The hidden node is such a child node in a middle layer that descends from both top layer property nodes.

If there is full overlap between a pair of properties (and therefore no hidden node), then its hierarchical graph represents the property that includes the superset of resources as a node in the top layer or a middle layer, the other property as a child node to the top/middle layer property node in the next lower graph layer, etc. The shared resources would be resource leaf nodes in the bottom layer and that are children of the middle layer property node. The non-shared resources of the top layer property node would be represented as direct children non-leaf nodes in the bottom layer of the graph.

At 616, the hierarchical graph(s) are populated with obtained estimated uniques determined from set(s) of panel data. The estimated count of unique resource users corresponding to each node (e.g., resource leaf node, hidden node, property node) of the hierarchical graph would be queried from a uniques estimation server (e.g., uniques estimation server 304 of FIG. 3) to populate the graph. The obtained estimated count of unique resource users corresponding to child nodes will then be used to determine the composition boundaries of its parent node(s) in the graph.

Figure 7:
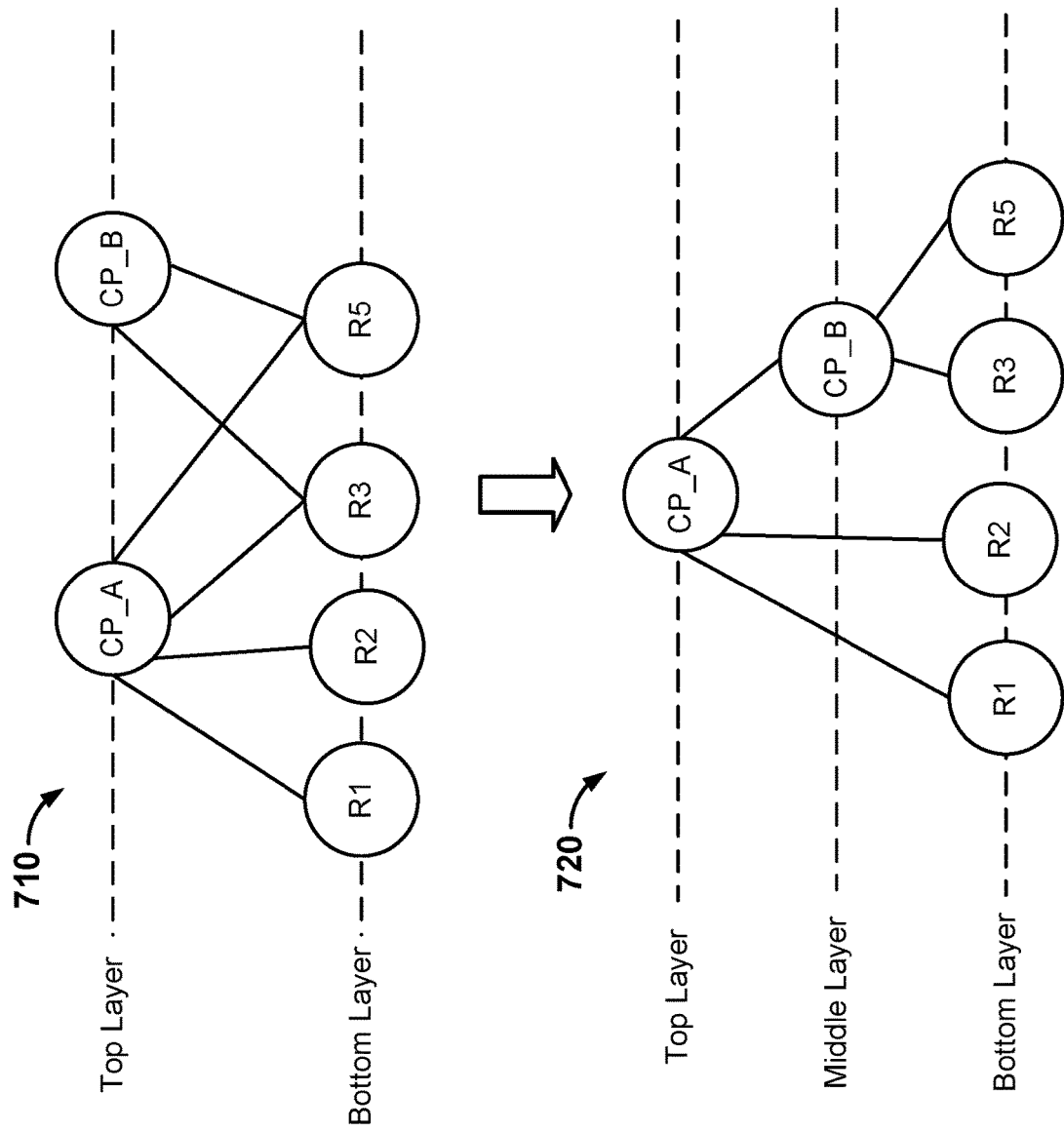
FIG. 7 is a diagram that shows examples of a bipartite graph and a hierarchical graph corresponding to two properties that fully overlap.

FIG. 7 is a diagram that shows examples of a bipartite graph and a hierarchical graph corresponding to two properties that fully overlap. The example of FIG. 7 shows two custom properties, CP_A and CP_B. Custom Property CP_A includes resources R1, R2, R3, and R5 and Custom Property CP_B includes resources R3 and R5. Custom Property CP_A has been compared to Custom Property CP_B such as described in process 600 of FIG. 6 and it has been determined that the two properties fully overlap. Specifically, Custom Property CP_A is a superset of the resources of Custom Property CP_B. Put another way, all of the resources (R3 and R5) of Custom Property CP_B are included in Custom Property CP_A. As such, there is no hidden node corresponding to the pair of properties. Bipartite graph 710 shows the nodes of Custom Property CP_A and Custom Property CP_B in the top layer. Bipartite graph 710 also shows that the nodes of resources R1, R2, R3, and R5 in the bottom layer descend from/are children of the Custom Property CP_A node and that the nodes of resources R3 and R5 in the bottom layer descend from/are children of the Custom Property CP_B. Hierarchical graph 720, which is derived/redrawn from bipartite graph 710, shows the node of Custom Property CP_A in the top layer and the node of Custom Property CP_B in the middle layer as a child node of Custom Property CP_A. Hierarchical graph 720 also shows non-shared resources R1 and R2 in the bottom layer as child nodes of Custom Property CP_A and shared resources R3 and R5 in the bottom layer as child nodes of Custom Property CP_B. In some embodiments, even when no hidden nodes are determined between two fully overlapped (e.g., custom) properties such as shown in the example of FIG. 7, compositional capping is still performed.

Figure 8:
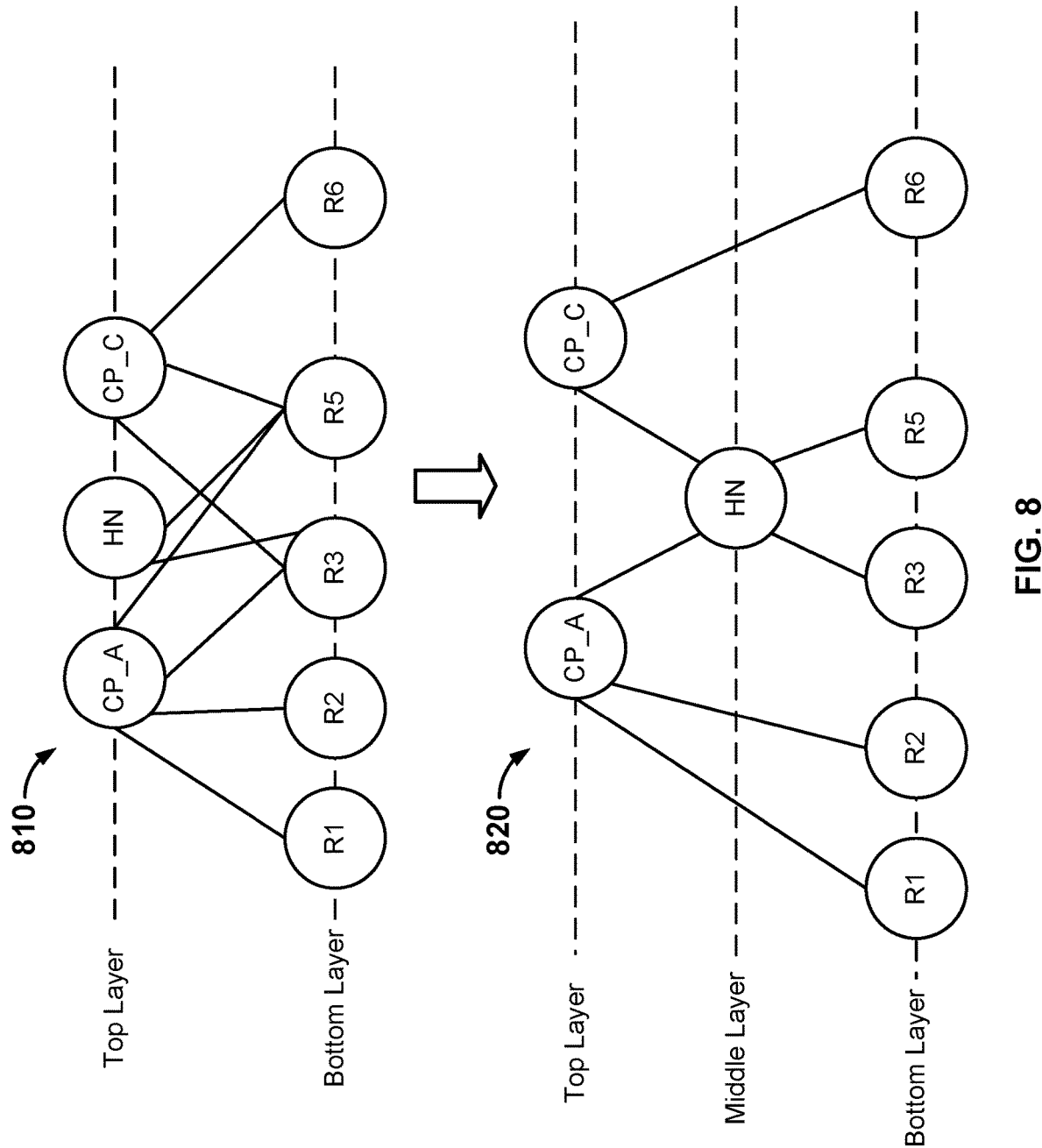
FIG. 8 is a diagram that shows examples of a bipartite graph and a hierarchical graph corresponding to two properties that share resources but do not fully overlap.

FIG. 8 is a diagram that shows examples of a bipartite graph and a hierarchical graph corresponding to two properties that share resources but do not fully overlap. In the example of FIG. 8, two custom properties are shown, CP_A and CP_C. Custom Property CP_A includes resources R1, R2, R3, and R5 and Custom Property CP_C includes resources R3, R5, and R6. Custom Property CP_A has been compared to Custom Property CP_C such as described in process 600 of FIG. 6 and it has been determined that the two properties include shared resources but do not fully overlap. Specifically, both Custom Property CP_A and Custom Property CP_C share resources R3 and R5. As such, Hidden Node HN that corresponds to shared resources R3 and R5 is recorded. Bipartite graph 810 shows the nodes of Custom Property CP_A, Hidden Node HN, and Custom Property CP_C in the top layer. Bipartite graph 810 also shows that the nodes of resources R1, R2, R3, and R5 in the bottom layer descend from/are children of the Custom Property CP_A node and that the nodes of resources R3, R5, and R6 in the bottom layer descend from/are children of the Custom Property CP_C. Furthermore, bipartite graph 810 shows that the set of shared resources, R3 and R5, in the bottom layer descend from/are children of Hidden Node HN. Hierarchical graph 820, which is derived/redrawn from bipartite graph 810, shows the nodes of Custom Property CP_A and Custom Property CP_C in the top layer. Hierarchical graph 820 also shows that non-shared resources R1 and R2 in the bottom layer are child nodes of Custom Property CP_A and non-shared resource R6 in the bottom layer is a child node of Custom Property CP_C. Hierarchical graph 820 shows Hidden Node HN in the middle layer and as a child node to both the nodes of Custom Property CP_A and Custom Property CP_C. Hierarchical graph 820 shows that shared resources R3 and R5 in the bottom layer as child nodes of Hidden Node HN.

Figure 9:
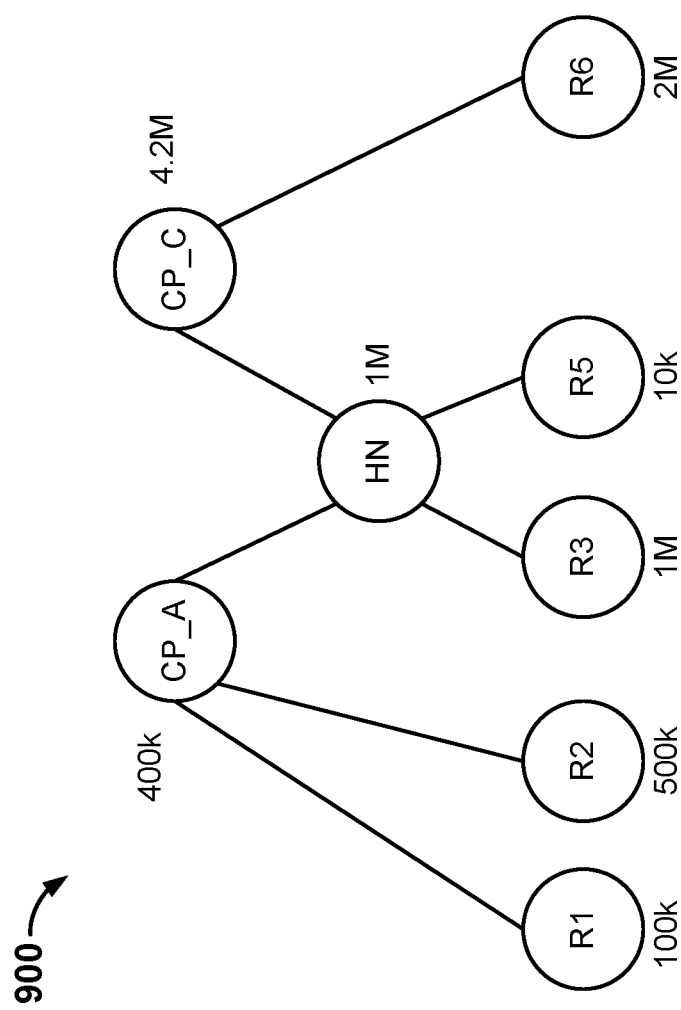
FIG. 9 is a diagram showing an example of a hierarchical graph that has been populated with an obtained estimated count of unique resource users corresponding to each node.

FIG. 9 is a diagram showing an example of a hierarchical graph that has been populated with an obtained estimated count of unique resource users corresponding to each node. Hierarchical graph 900 is the same as hierarchical graph 820 of FIG. 8 but populated with an estimated count of unique resource users that were queried for each node of the graph. In some embodiments, the estimated count of unique resource users for each node is determined by querying a uniques estimation server (e.g., uniques estimation server 304 of FIG. 3) for the estimate associated with that node's property, resource, or relationship to resource(s) and properties. In the example of FIG. 9, Resource R1's obtained estimated count of unique resource users is 100k, obtained Resource R2's obtained estimated count of unique resource users is 500k, Resource R3's obtained estimated count of unique resource users is 1M, Resource R5's obtained estimated count of unique resource users is 10k, and Resource R6's obtained estimated count of unique resource users is 2M. Hidden Node HN's obtained estimated deduplicated count of unique resource users is 1M. Custom Property CPA's obtained estimated aggregate count of unique resource users is 400k and Custom Property CP_C's obtained estimated aggregate count of unique resource users is 4.2M. As will be described in further detail below, the obtained estimated deduplicated count of unique resource users corresponding to Hidden Node HN, the obtained estimated aggregate count of unique resource users of Custom Property CP_A, and the obtained estimated aggregate count of unique resource users of Custom Property CP_C are each to be evaluated and potentially corrected/adjusted after comparisons to their respective composition boundaries that are to be determined from the obtained or corrected estimated counts of unique resource users associated by their respective child nodes in hierarchical graph 900.

Figure 10:
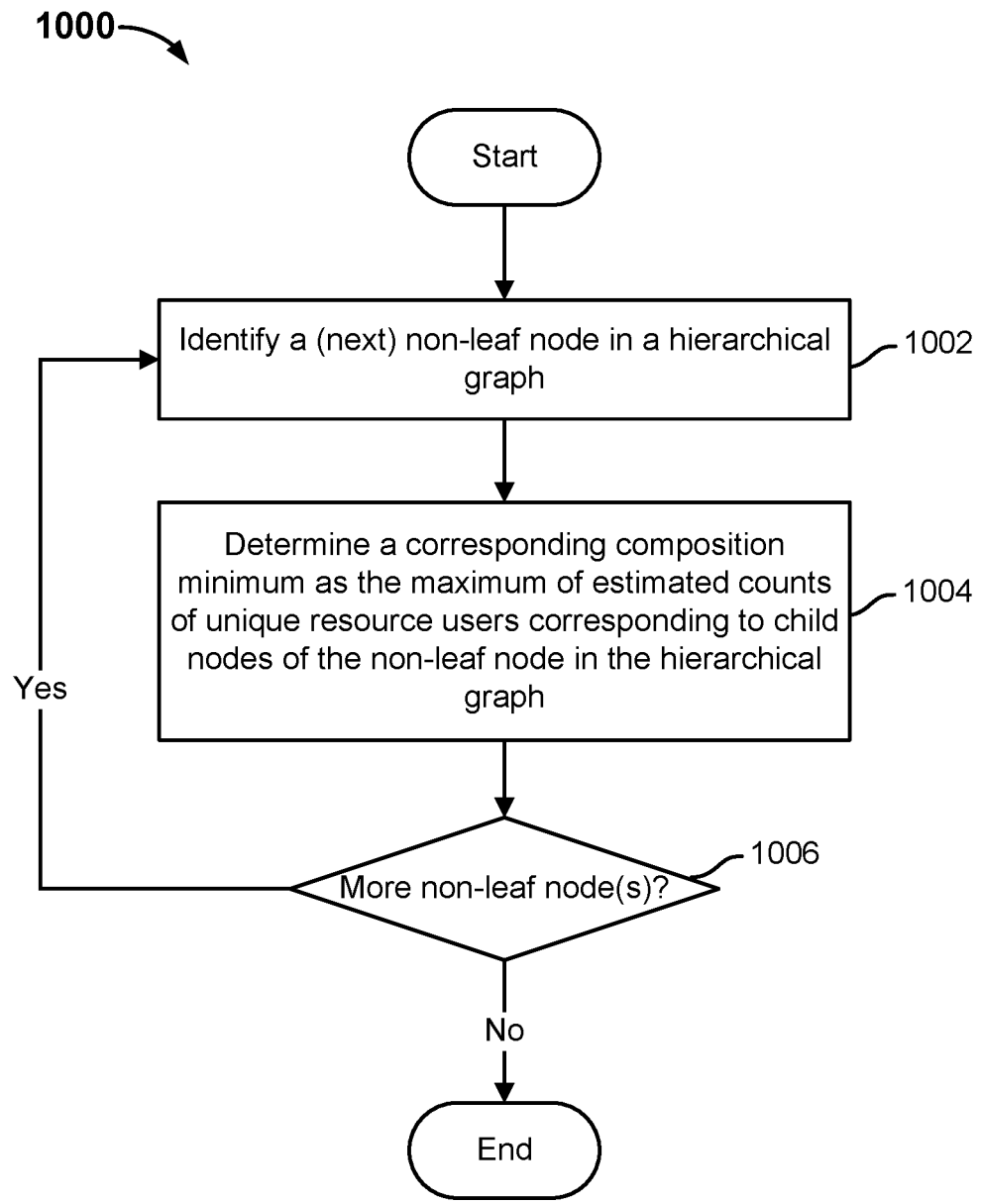
FIG. 10 is a flow diagram showing an example process for determining the composition minimum corresponding to non-leaf nodes of a hierarchical graph in accordance with some embodiments.

FIG. 10 is a flow diagram showing an example process for determining the composition minimum corresponding to non-leaf nodes of a hierarchical graph in accordance with some embodiments. In some embodiments, process 1000 is implemented at least in part by custom property uniques estimation correction server 306 of system 300 of FIG. 3. In some embodiments, step 510 of process 500 of FIG. 5 may be implemented, at least in part, using process 1000.

The "composition minimum" of a non-leaf node (e.g., either a custom property or a hidden node) represents the floor on the estimated aggregate/deduplicated count of unique resource users that can be associated with that node given the respective estimated count of unique resource users of its child nodes. Conceptually, the floor on the estimated aggregate/deduplicated count of unique resource users that can be associated with that node is the case in which the unique resource users of the child nodes fully overlap with the unique resource users of the largest child node. As such, process 1000 describes one example technique of determining the composition minimum of a non-leaf node as the maximum estimated count of unique resource users among the two or more child nodes of the non-leaf node. As mentioned above, in some embodiments where the uniques of production properties are fixed by design, the composition minimum of a non-leaf node may be affected by its child node(s) and at least one parent node.

At 1002, a (next) non-leaf node in a hierarchical graph is identified. In some embodiments, each non-leaf node comprising either a custom property (e.g., in the top layer or a middle layer of the graph) or a hidden node (e.g., in a middle layer of the graph) is identified for determining a composition minimum. In some other embodiments, production property nodes are also identified for determining respective composition minima. In various embodiments, no composition minima are determined for leaf nodes, which are resources of hierarchical graphs.

At 1004, a corresponding composition minimum is determined based on the maximum of estimated counts of unique resource users corresponding to child nodes of the non-leaf node in the hierarchical graph. The estimated counts of unique resource users for each child node of the non-leaf node is determined and the maximum of the estimated counts is determined as the composition minimum of the non-leaf node under consideration.

At 1006, whether there is at least one more non-leaf node in the hierarchical graph to consider is determined. In the event that there is at least one more non-leaf node in the hierarchical graph to consider, control is returned to 1002. Otherwise, in the event that there are no more non-leaf nodes in the hierarchical graph to consider, process 1000 ends.

While process 1000 seems to suggest that composition minima are determined sequentially for non-leaf nodes in a hierarchical graph, if linear programming is used to determine graph-based composition capping, the determination of composition minima for multiple non-leaf nodes can be at least partially simultaneously performed.

Figure 11:
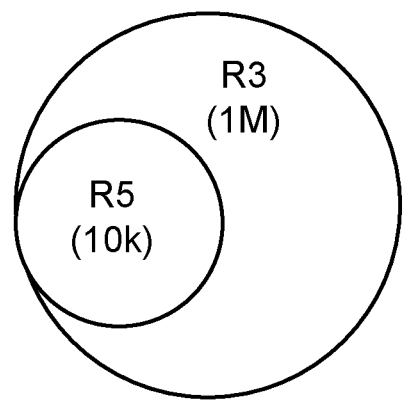
FIG. 11 shows an example representation of the composition minimum of a non-leaf node with two child nodes in a hierarchical graph.

FIG. 11 shows an example representation of the composition minimum of a non-leaf node with two child nodes in a hierarchical graph. Specifically, FIG. 11 shows a representation of the composition minimum corresponding to the hidden node (HN) of hierarchical graph 900 of FIG. 9. The representation of FIG. 11 shows the hypothetical scenario in which case the 1M estimated count of unique resource users of resource R3 wholly contains the 10k estimated count of unique resource users of resource R5. Given this potentially full overlap of the estimated counts of unique resource users of resources R3 and R5, the floor on the estimated deduplicated count of unique resource users of its parent, Hidden Node HN, cannot be less than the estimated count of unique resource users of the larger resource of 1M of R3.

Figure 12:
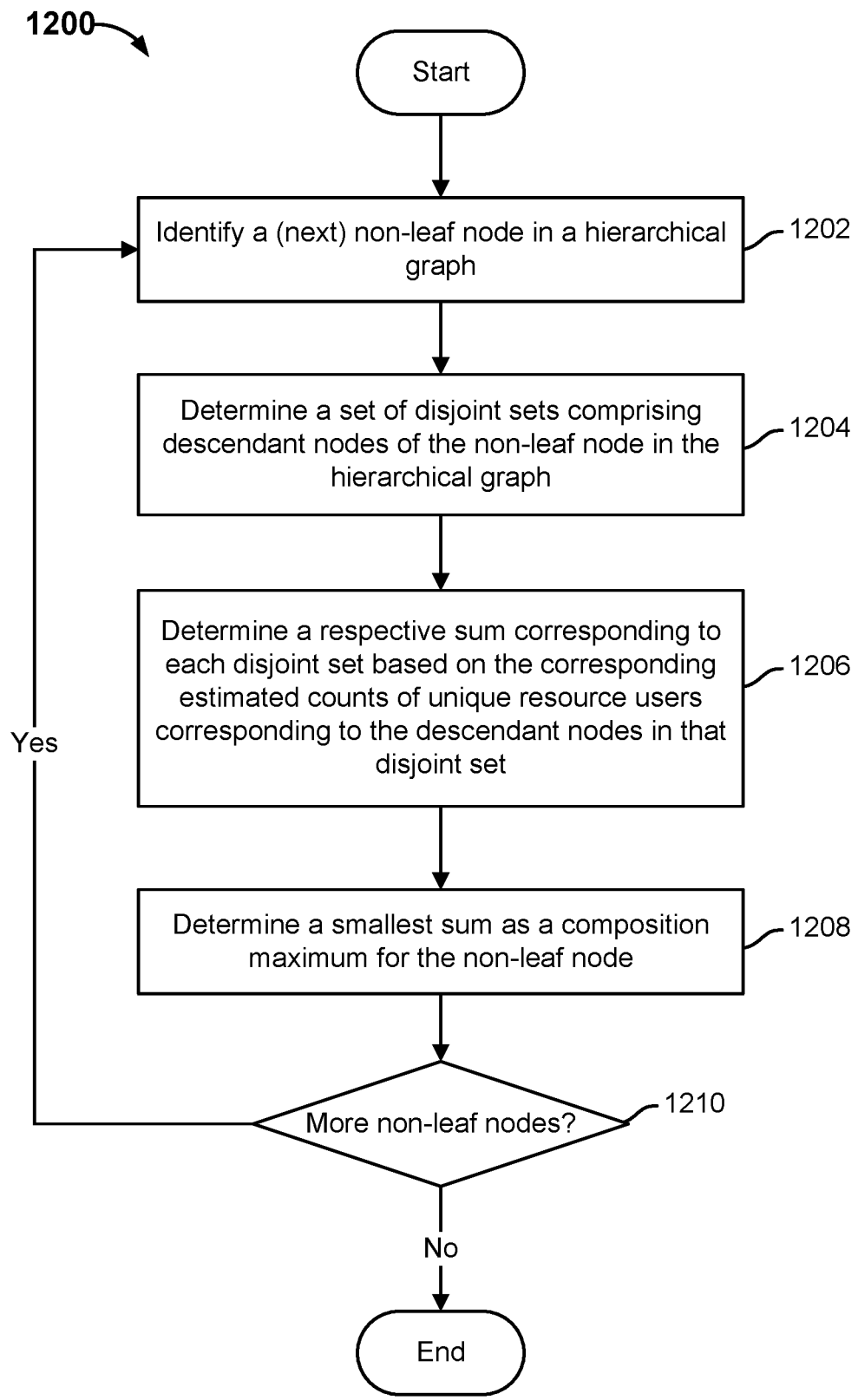
FIG. 12 is a flow diagram showing an example process for determining the composition maximum corresponding to non-leaf nodes of a hierarchical graph in accordance with some embodiments.

FIG. 12 is a flow diagram showing an example process for determining the composition maximum corresponding to non-leaf nodes of a hierarchical graph in accordance with some embodiments. In some embodiments, process 1200 is implemented at least in part by custom property uniques estimation correction server 306 of system 300 of FIG. 3. In some embodiments, step 510 of process 500 of FIG. 5 may be implemented, at least in part, using process 1200.

The "composition maximum" of a non-leaf node (e.g., either a custom property or a hidden node) represents the ceiling on the estimated aggregate/deduplicated count of unique resource users that can be associated with that node given the respective estimated counts of unique resource users of its child nodes. Conceptually, the ceiling on the estimated aggregate/deduplicated count of unique resource users that can be associated with that node is the case in which the unique resource users of the child nodes are fully disjoint from each other. As such, process 1200 describes determining the composition maximum of a non-leaf node as the minimum sum of the estimated count of unique resource users corresponding to disjoint sets of the two or more child nodes of the non-leaf node.

At 1202, a (next) non-leaf node in a hierarchical graph is identified. In some embodiments, each non-leaf node comprising either a custom property (e.g., in the top layer or a middle layer of the graph) or a hidden node (e.g., in a middle layer of the graph) is identified for determining a composition maximum. In some other embodiments, production property nodes are also identified for determining respective composition maxima. In various embodiments, no composition maxima are determined for leaf nodes, which are resources of hierarchical graphs.

At 1204, a set of disjoint sets comprising descendant nodes of the non-leaf node in the hierarchical graph is determined. The disjoint set of a non-leaf node comprises the largest sets of its non-overlapping descendent nodes that entirely cover the subgraph that descend from the non-leaf node.

At 1206, a respective sum corresponding to each disjoint set is determined based on the corresponding estimated counts of unique resource users corresponding to the descendant nodes in that disjoint set. If there is more than one disjoint set among the non-leaf node's descendant nodes, then composition maximum of the non-leaf node is minimum of the sum of the uniques of the descendant nodes in each disjoint sum. Put another way, the disjoint sets of the non-leaf node, where each disjoint set comprises largest sets of non-overlapping descendant nodes that entirely cover a portion of the hierarchical graph that descends from the non-leaf node, are determined. The sum of the estimated counts of unique resource users of each node within each disjoint set is determined as the sum corresponding to that disjoint set.

At 1208, a composition maximum for the non-leaf node is determined based as the smallest sum. The smallest disjoint set sum is then determined as the composition maximum for the non-leaf node.

At 1210, whether there is at least one more non-leaf node in the hierarchical graph to consider is determined. In the event that there is at least one more non-leaf node in the hierarchical graph to consider, control is returned to 1202. Otherwise, in the event that there are no more non-leaf nodes in the hierarchical graph to consider, process 1200 ends.

While process 1200 seems to suggest that composition maxima are determined sequentially for non-leaf nodes in a hierarchical graph, if linear programming is used to determine graph-based composition capping, the disjoint sets and then composition maxima for multiple non-leaf nodes can be at least partially simultaneously performed. For a given non-leaf node with its set of descendant nodes (e.g., resources, properties, nested custom properties, hidden nodes), graph algorithms can be applied to detect disjoint sets, which define upper constraints for the linear programming procedure. The disjoint sets can be detected through obtaining the maximal independent sets (disjoint sets) (largest sets of non-overlapping descendent nodes that entirely cover a graph) of a custom property's child entities, for example. If a given non-leaf node's graph is small enough, the exact maximal independent sets of the non-leaf node is determined by finding the cliques of the complementary graph. If a given non-leaf node's graph is too large:

Sort the nodes of the graph to get the top priority nodes.
    Get the exact maximal independent sets for the subgraph with these top priority nodes.
Use a greedy algorithm to add the disjoint set of remaining nodes to the independent sets created thus far.

Figure 13:
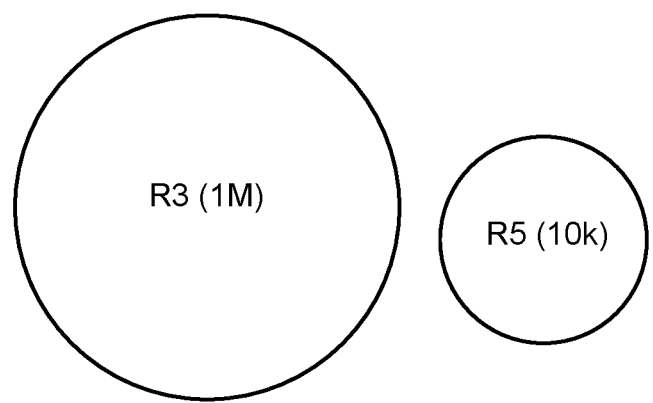
FIG. 13 shows an example representation of the composition maximum of a non-leaf node with two child nodes in a hierarchical graph.

FIG. 13 shows an example representation of the composition maximum of a non-leaf node with two child nodes in a hierarchical graph. Specifically, FIG. 13 shows a representation of the composition maximum corresponding to the hidden node of hierarchical graph 900 of FIG. 9. Given that the hidden node of hierarchical graph 900 of FIG. 9 includes only two child nodes corresponding to resources R3 and R5, there is only one disjoint set corresponding to the hidden node and that disjoint set contains the nodes of R3 and R5. The representation of FIG. 13 shows the hypothetical scenario in which case the 1M estimated count of unique resource users of resource R3 is fully disjoint relative to the 10k estimated count of unique resource users of resource R5. Given this potentially fully disjoint relationship between the estimated counts of unique resource users of resources R3 and R5, the ceiling on the estimated deduplicated count of unique resource users of its parent, the hidden node cannot be more than the sum of the respective estimated counts of unique resource users corresponding to R3 and R5 (1M+0.01M=1.01M).

Figure 14:
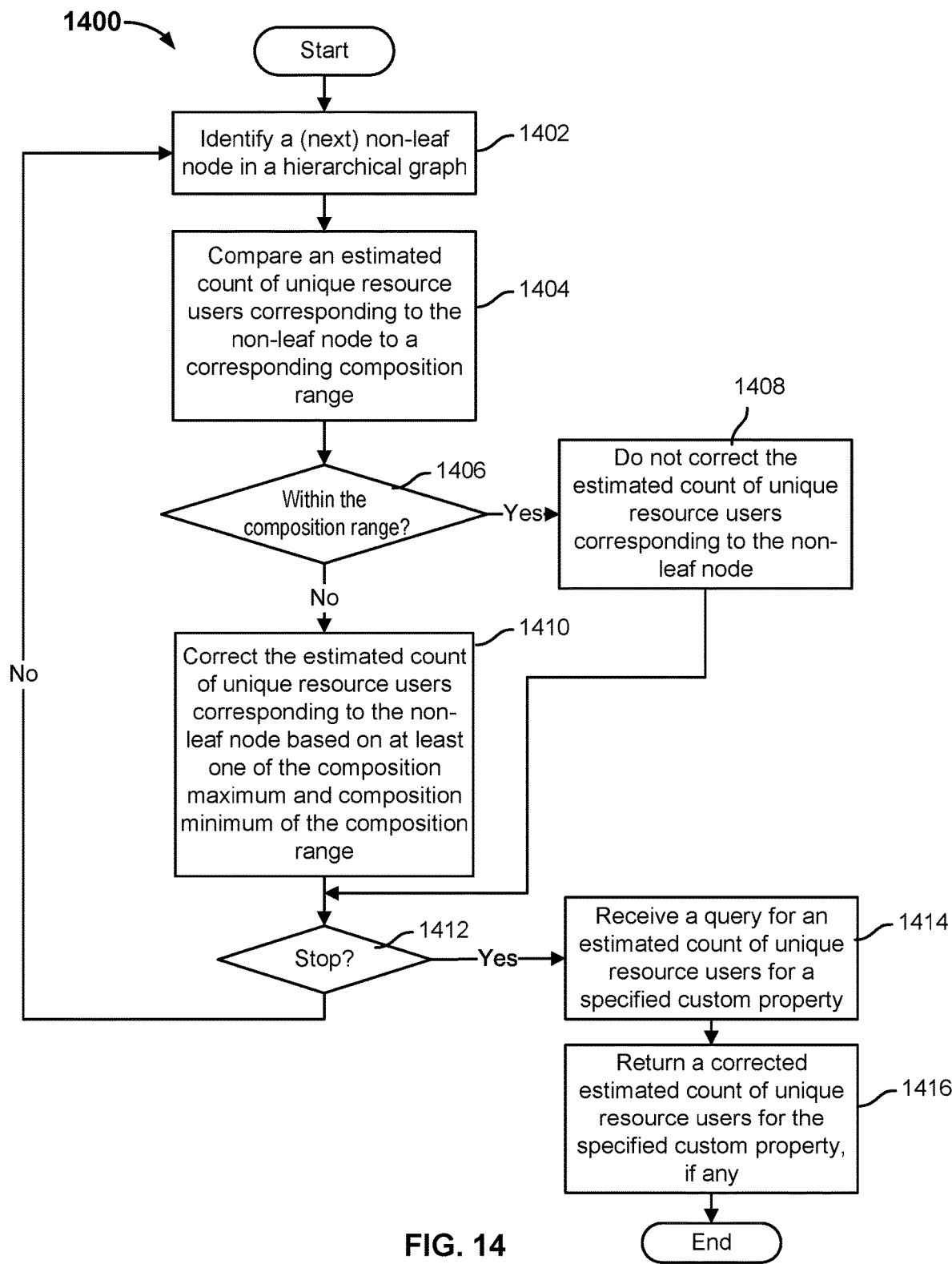
FIG. 14 is a flow diagram showing an example process of correcting estimated counts of unique resource users corresponding to non-leaf nodes in a hierarchical graph.

FIG. 14 is a flow diagram showing an example process of correcting estimated counts of unique resource users corresponding to non-leaf nodes in a hierarchical graph. In some embodiments, process 1400 is implemented at least in part by custom property uniques estimation correction server 306 of system 300 of FIG. 3. In some embodiments, step 512 of process 500 of FIG. 5 may be implemented, at least in part, using process 1400.

At 1402, a (next) non-leaf node in a hierarchical graph is identified. In some embodiments, each non-leaf node comprising either a custom property (e.g., in the top layer or a middle layer of the graph) or a hidden node (e.g., in a middle layer of the graph) is identified for potentially correcting the obtained estimated count of unique resource users thereof. In some other embodiments, production property nodes are also identified for potentially correcting the obtained estimated counts of unique resource users thereof. In various embodiments, the estimated counts of unique resource users for leaf nodes, which are resources of hierarchical graphs, are not adjusted/corrected.

At 1404, an estimated count of unique resource users is compared to the non-leaf node to a corresponding composition range. The previous determined composition range comprising the composition minimum (e.g., that was determined using process 1000 of FIG. 10) and the composition maximum (e.g., that was determined using process 1200 of FIG. 12) of the non-leaf node is compared to the estimated count of unique resource users that was previously obtained (e.g., from uniques estimation server 304 of FIG. 3) for the non-leaf node.

At 1406, whether the estimated count of unique resource users is within the composition range is determined. In the event that the estimated count of unique resource users is within the composition range, control is transferred to 1408. Otherwise, in the event that the estimated count of unique resource users is not within the composition range, control is transferred to 1410. For example, it is checked whether the estimated count of unique resource users corresponding to the non-leaf node is below the composition minimum of that node. Also, for example, it is checked whether the estimated count of unique resource users corresponding to the non-leaf node is above the composition maximum of that node. In the event that the estimated count of unique resource users corresponding to the non-leaf node is within the composition range (e.g., is equal to or greater than the composition minimum or equal to or less than the composition maximum), the estimated count of unique resource users corresponding to the non-leaf node does not need to be corrected/adjusted and process 1400 ends. But if the estimated count of unique resource users corresponding to the non-leaf node is not within the composition range, then the estimated count of unique resource users corresponding to the non-leaf node needs to be corrected at step 1410.

At 1408, the estimated count of unique resource users corresponding to the non-leaf node is not corrected.

At 1410, the estimated count of unique resource users corresponding to the non-leaf node is corrected based on at least one of the composition maximum and composition minimum of the composition range. The estimated count of unique resource users corresponding to the non-leaf node is corrected to be within the composition range defined by the composition minimum and composition maximum. For example, if the estimated count of unique resource users corresponding to the non-leaf node is below the composition minimum of that node, then the estimated count of unique resource users corresponding to the non-leaf node is corrected to match/be equal to the composition minimum. Also, for example, if the estimated count of unique resource users corresponding to the non-leaf node is greater than the composition maximum of that node, then the estimated count of unique resource users corresponding to the non-leaf node is corrected to match/be equal to the composition maximum. In yet another example, if the estimated count of unique resource users corresponding to the non-leaf node is not within the composition range, then the estimated count of unique resource users corresponding to the non-leaf node can be corrected to match/be equal to the average of the composition minimum and the composition maximum.

At 1412, whether there is at least one more non-leaf node for a corresponding estimated count of unique resource users is determined. In the event there is at least one more non-leaf node for which a corresponding estimated count of unique resource users is to be determined, control is returned to 1402. Otherwise, in the event that there are no non-leaf nodes for which a corresponding estimated count of unique resource users is to be determined, control is transferred to 1414. All the (e.g., hidden node and custom property) non-leaf nodes in a hierarchical graph that are designated as being correctable have their estimated counts of unique resource users evaluated against their respective composition ranges to determine whether the former is to be corrected.

While steps 1402, 1404, 1406, 1408, and 1410 are described as occurring sequentially for different non-leaf nodes in the hierarchical graph, in some embodiments, such as when linear programming is used, such steps may occur at least partially simultaneously for the various non-leaf nodes for which corrections of uniques are to be performed. As mentioned above, where linear programming is used, the composition boundaries (composition minima and composition maxima) of the non-leaf nodes are inequality constraints that the corrected uniques corresponding to those non-leaf nodes must obey. In some embodiments, where the estimated counts of unique resource users of production property non-leaf nodes are fixed (designated as not able to be corrected), then the linear programming would treat the estimated uniques as frozen and not adjustable but that their estimated uniques would still affect the composition boundaries of correctable, parent hidden nodes and correctable, parent custom property nodes.

At 1414, a query for an estimated count of unique resource users for a specified custom property is received. A query for an estimated count of unique resource users for a specified custom property may be submitted by a requestor user via a user interface. An example use case is that the requestor had defined a new custom property by configuring an arbitrary collection of resources and then wishes to know the estimated aggregate count of unique users across all the resources in the custom property. After that custom property is compared pairwise with each other property (e.g., within a given set), an hierarchical graph is created for the custom property and at least one other property with which it shares resources, and the estimated counts of unique resource users are corrected as described above, the corrected estimated count of unique resource users for that custom property may be queried by that requestor.

At 1416, a corrected estimated count of unique resource users for the specified custom property, if any, is returned. As described above, only if the custom property's estimated count of unique resource users was outside of its corresponding composition range would the estimated uniques be corrected. If the specified custom property's uniques were corrected, then the corrected estimated uniques are returned in response to the query. But if the specified custom property's uniques were not corrected, then the obtained estimated uniques, without correction, are returned in response to the query.

Figure 15:
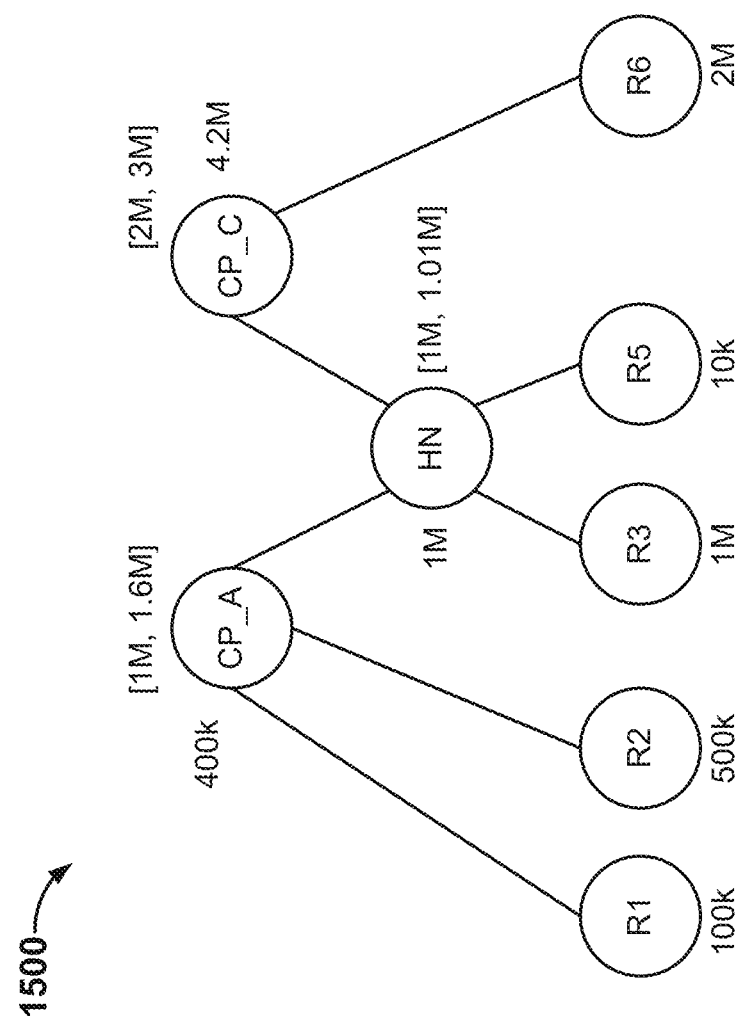
FIG. 15 is a diagram showing an example of a hierarchical graph that shows the relationships between two custom properties and the composition boundaries corresponding to the non-leaf nodes.

FIG. 15 is a diagram showing an example of a hierarchical graph that shows the relationships between two custom properties and the composition boundaries corresponding to the non-leaf nodes. Hierarchical graph 1500 is the same as hierarchical graph 900 of FIG. 9 only with the additions of composition boundaries ([composition minimum, composition maximum]) corresponding to the two custom property nodes, CP_A and CP_C, and the hidden node, HN. In some embodiments, the composition boundaries of the non-leaf nodes were determined using processes such as process 1000 of FIG. 10 and process 1200 of FIG. 12.

The composition minimum corresponding to Hidden Node HN is determined as the maximum of the estimated counts of unique resource users corresponding to its child nodes, resources R3 (1M uniques) and R5 (10k uniques). As such, the composition minimum of Hidden Node HN is determined to be the 1M uniques of R3, which is greater than the 10k uniques of R5. The composition maximum corresponding to Hidden Node HN is determined as the minimum of the respective sums of the estimated uniques of child nodes in each disjoint set of HN (where each disjoint set includes nonoverlapping sets of nodes that descend from HN). HN has only one disjoint set, which includes resources R3 (1M uniques) and R5 (10k uniques), and so the composition maximum of HN is the sum of the uniques of R3 (1M uniques) and (10k uniques), 1.01M uniques.

The composition minimum corresponding to Custom Property CP_A is determined as the maximum of the estimated counts of unique resource users corresponding to its child nodes, Resource R1 (100k uniques), Resource R2 (500k uniques), and Hidden Node HN (1M uniques). As such, the composition minimum of Custom Property CP_A is determined to be the 1M uniques of HN, which is greater than both the 100k uniques of R1 and the 500k uniques of R2. The composition maximum corresponding to Custom Property CP_A is determined as the minimum of the respective sums of the estimated uniques of child nodes in each disjoint set of CP_A (where each disjoint set includes nonoverlapping sets of nodes that descend from CP_A). CP_A has the following two disjoint sets:

Disjoint set 1: R1 (100k uniques), R2 (500k uniques), and HN (1M uniques); sum=1.6M uniques Disjoint set 2: R1 (100k uniques), R2 (500k uniques), R3 (1M uniques), and R5 (10k uniques); sum=1.61M uniques As such, the composition maximum of Custom Property CP_A is determined to be 1.6M of Disjoint set 1, which is the lower of the two disjoint sums.

The composition minimum corresponding to Custom Property CP_C is determined as the maximum of the estimated counts of unique resource users corresponding to its child nodes, HN (1M uniques) and R6 (2M uniques). As such, the composition minimum of Custom Property CP_C is determined to be the 2M uniques of R6, which is greater than the 1M uniques of HN. The composition maximum corresponding to Custom Property CP_C is determined as the minimum of the respective sums of the estimated uniques of child nodes in each disjoint set of CP_C (where each disjoint set includes nonoverlapping sets of nodes that descend from CP_C). CP_C has the following two disjoint sets:

Disjoint set 1: HN (1M uniques) and R6 (2M uniques); sum=3M uniques

Disjoint set 2: R3 (1M uniques), R5 (10k uniques), and R6 (2M uniques); sum=3.01M uniques As such, the composition maximum of Custom Property CP_C is determined to be 3M of Disjoint set 1, which is the lower of the two disjoint sums.

Figure 16:
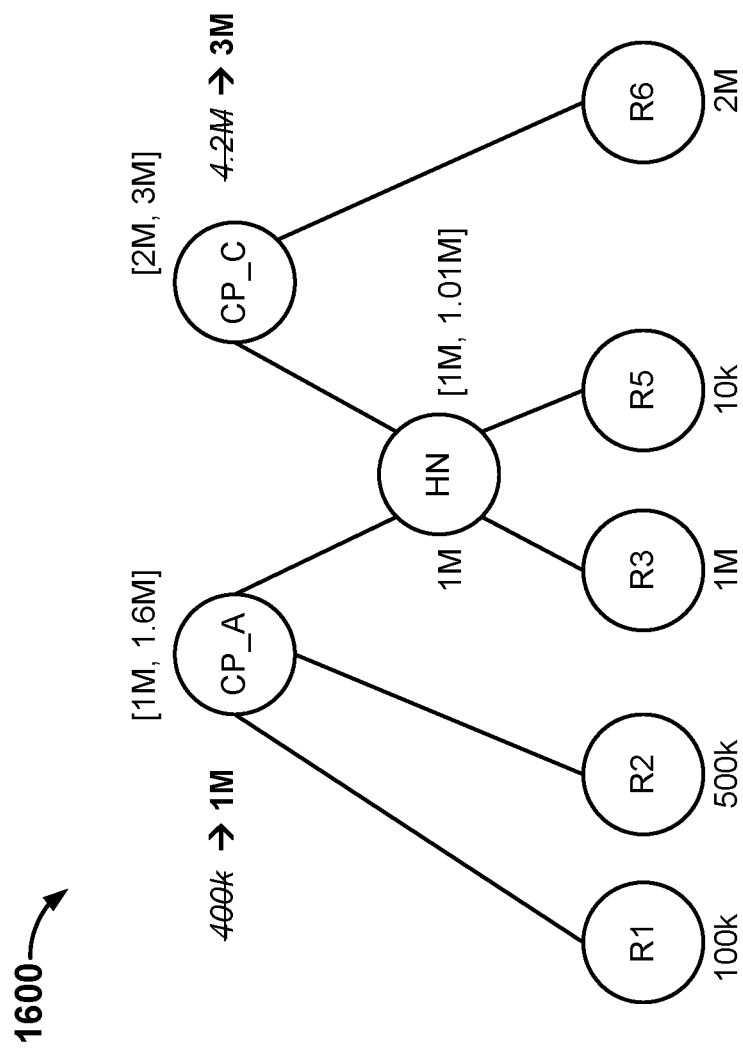
FIG. 16 is a diagram showing an example of a hierarchical graph that shows the corrected estimated counts of unique resource users corresponding to the non-leaf nodes.

FIG. 16 is a diagram showing an example of a hierarchical graph that shows the corrected estimated counts of unique resource users corresponding to the non-leaf nodes. Hierarchical graph 1600 is the same as hierarchical graph 1500 of FIG. 15 only with the additions of corrected estimated counts of unique resource users corresponding to the two custom property nodes, CP_A and CP_C. In some embodiments, the correction of the estimated uniques of the non-leaf nodes was determined using processes such as process 1400 of FIG. 14. The estimated count of unique resource users corresponding to each of the non-leaf nodes of the graph were compared to their nodes' respective composition boundaries. Because the estimated count of unique resource users of Hidden Node HN (1M uniques) was within the [1M, 1.01M] composition boundaries of HN, the estimated uniques of HN were not corrected/adjusted. However, because the estimated count of unique resource users of CP_A (400k uniques) was below the 1M composition minimum of CP_A, the estimated uniques of CP_A was adjusted. In the example of FIG. 16, the estimated uniques of CP_A was adjusted to match the 1M composition minimum of CP_A. Similarly, the estimated count of unique resource users of CP_C (4.2M uniques) was above the 3M composition maximum of CP_C, the estimated uniques of CP_C was adjusted. In the example of FIG. 16, the estimated uniques of CP_C was adjusted to match the 3M composition maximum of CP_C. As a result of the corrections described above, the estimated uniques of the non-leaf nodes of hierarchical graph 1600 are self-consistent with the estimated uniques of their child entities and in relation to each other. Also, for example, if the estimated uniques were queried for Custom Property CP_A, the corrected estimated uniques value of 1M would be returned, rather than the pre-corrected estimate of 400k. Similarly, for example, if the estimated uniques were queried for Custom Property CP_C, the corrected estimated uniques value of 3M would be returned, rather than the pre-corrected estimate of 4.2M.

As mentioned above, in some embodiments, linear programming can be used to concurrently correct the estimated uniques corresponding to various non-leaf nodes of a hierarchical graph by optimizing the estimated uniques in accordance with constraints such as the composition boundaries of CP_A, CP_C, and HN. In some embodiments, if a production property node had been included in hierarchical graph 1600, then its corresponding estimated uniques would have been a constraint that is fixed/frozen value in the correction of the estimated uniques corresponding to the nodes of the hidden node and custom properties (CP_A, CP_C, and HN).

While the estimated uniques of hidden node HN did not need to be corrected when compared to its composition boundaries in the example of FIG. 16, in another example in which the estimated uniques of hidden node HN did need to be corrected, then this correction could potentially propagate upwards to change the composition boundaries of one or more of its parent nodes, Custom Properties CP_A and CP_C.

Figure 17:
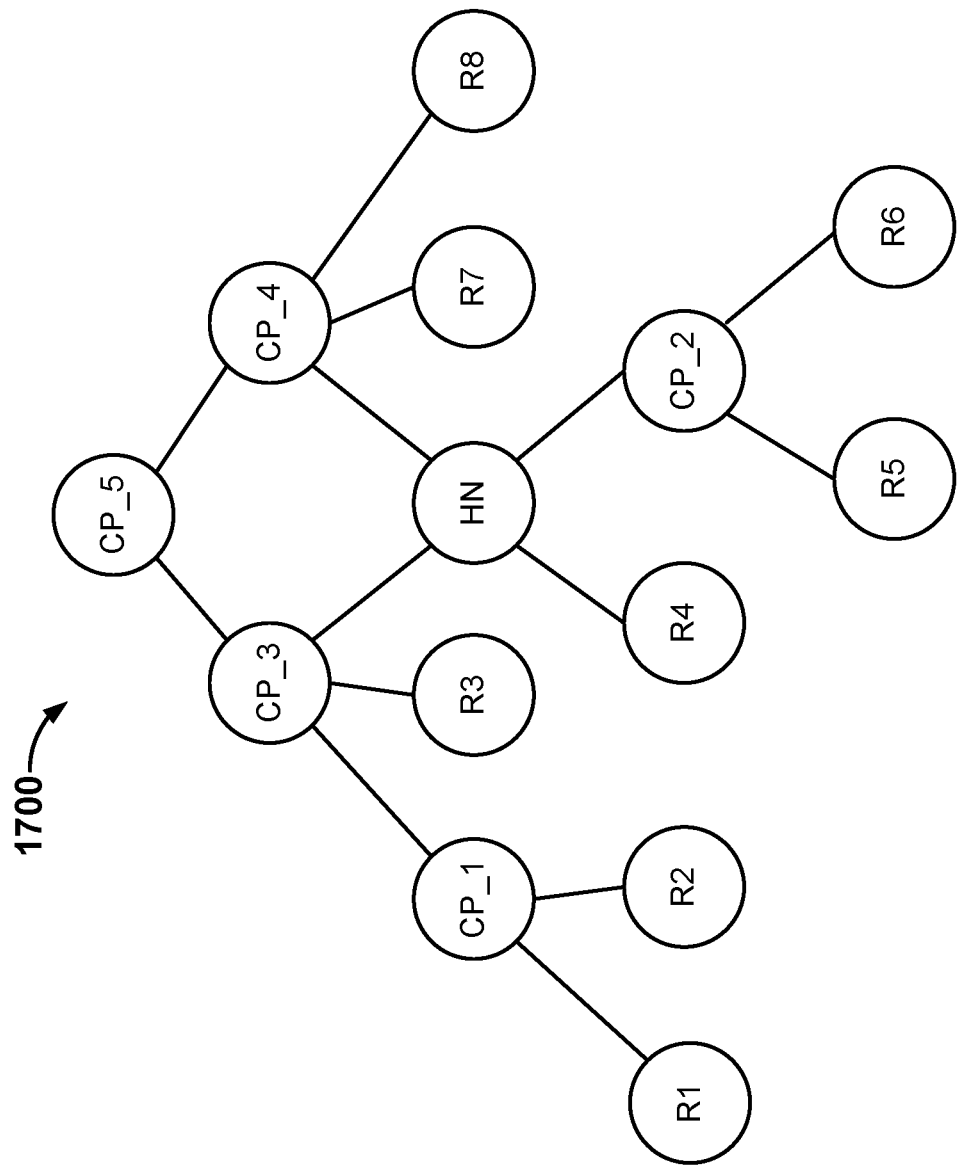
FIG. 17 is a diagram showing an example of a hierarchical graph that shows the relationships among several properties, including ones that are nested within other properties.

FIG. 17 is a diagram showing an example of a hierarchical graph that shows the relationships among several properties, including ones that are nested within other properties. In some embodiments, hierarchical graph 1700 was generated after pairwise comparisons of resources were made between at least some pairs among Custom Properties CP_1, CP_2, CP_3, CP_4, and CP_5. As shown in hierarchical graph 1700, Custom Property CP_1 is nested under CP_3, CP_2 is nested under CP_3 and CP_4, and CP_3 and CP_4 are both ultimately nested under CP_5. Furthermore, CP_3 and CP_4 were determined to share child entities of resource R4 and CP_2, which includes resources R5 and R6, and as such, Hidden Node HN is shown to descend from the nodes of CP_3 and CP_4 and have the child leaf nodes of resource R4 and CP_2.

The relatively more complex hierarchical graph 1700 of FIG. 17 is meant to illustrate the presence of multiple disjoint sets corresponding to a custom property node that is located in a higher layer and therefore, the presence of hidden nodes in at least one disjoint set, which reflects the degree of overlap of unique resource users among shared resources, to potentially influence the composition boundaries of the higher, parent custom property node. Specifically, an initial estimate of the composition maximum of the Custom Property CP_4 would be the sum of the uniques of a first disjoint sum that comprises the Resources R4 through R8. However, the overlap of the Resources R4, R5, and R6 have been determined by estimating the uniques of Hidden Node HN. Perhaps Resources R4, R5, and R6 have no overlap, so that the sum of the uniques of R4 through R8 is the proper boundary for CP_4, but perhaps Resources R4, R5, and R6 are fully overlapped. Therefore, it is more accurate to define the composition maximum of CP_4 as the sum of the uniques of the second disjoint set that comprises HN, R7, and R8 because HN accounts for any overlap among Resources R4, R5, and R6 and therefore, the disjoint sum of HN, R7, and R8 is likely lower than the disjoint sum of Resources R4 through R8.

Another aspect that the complex hierarchical graph 1700 of FIG. 17 is meant to illustrate is that given the nested parent-child relationships between properties, sub-properties, and resources, the errors associated with estimated sampling rates that were used to estimate the uniques of resources or estimate the aggregate uniques of sub-properties will propagate up to the properties higher in the graph, which will therefore compound the error in the estimated aggregate uniques of the higher layer properties. For example, the errors associated with the estimated sampling rates that were used to estimate the uniques of Resources 1 and 2 could affect (e.g., increase the error of) the estimated aggregate uniques of their parent node, Custom Property CP_1. Then, the error of the estimated aggregate uniques and/or estimated sampling rate of Custom Property CP_1 could affect (e.g., increase the error of) the estimated aggregate uniques of its parent node, Custom Property CP_3, and so forth. The upward propagation of error in the hierarchical graph depicting the relationships among custom properties is mitigated by the composition capping-based corrections as described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface; and
a processor configured to:
determine a set of shared resources between a first property and a second property, wherein the first property comprises a custom property comprising a configurable collection of two or more resources;
record a hidden node in a hierarchical graph corresponding to the first property and the second property as a parent node to the set of shared resources, wherein the hidden node represents a degree of overlap among estimated unique resource users corresponding to respective ones of the set of shared resources;
obtain an estimated aggregate count of unique resource users corresponding to the first property, wherein the estimated aggregate count of unique resource users is determined based at least in part on an estimated sampling rate associated with one or more samples of a plurality of recorded user activities;
obtain an estimated deduplicated count of unique resource users across the set of shared resources based on respective resource-specific estimated deduplicated counts of unique resource users corresponding to each shared resource in the set of shared resources, wherein the estimated deduplicated count of unique resource users corresponds to the hidden node in the hierarchical graph;
determine a minimum boundary and a maximum boundary corresponding to the first property based at least in part on the estimated deduplicated count of unique resource users corresponding to the hidden node; and
correct the estimated aggregate count of unique resource users corresponding to the first property based at least in part on the minimum boundary and the maximum boundary, including to:
in response to a determination that the estimated aggregate count of unique resource users corresponding to the first property is outside of the minimum boundary and the maximum boundary, adjust the estimated aggregate count of unique resource users corresponding to the first property to a value within the minimum boundary and the maximum boundary.

2. The system of claim 1, wherein the custom property comprises a first custom property, and wherein the second property comprises a second custom property.

3. The system of claim 1, wherein the second property comprises a production property.

4. The system of claim 1, wherein the processor is further configured to:
compare first resources belonging to the first property to second resources belonging to the second property;
determine a pairwise overlap weight based on the comparison; and
determine that the set of shared resources exists based on the pairwise overlap weight.

5. The system of claim 1, wherein the processor is configured to generate a bipartite graph based at least in part on the first property and the second property, wherein the bipartite graph comprises the set of shared resources as descendant nodes to the hidden node.

6. The system of claim 5, wherein the processor is further configured to convert the bipartite graph into the hierarchical graph, wherein the hierarchical graph comprises the hidden node as a child node to both the first property and the second property.

7. The system of claim 6, wherein the minimum boundary corresponding to the first property is determined as the maximum value of the estimated counts of unique resource users corresponding to the respective ones of the set of shared resources.

8. The system of claim 6, wherein the maximum boundary corresponding to the first property is determined including to:
determine disjoint sets corresponding to the first property in the hierarchical graph;
determine corresponding disjoint sums corresponding to the disjoint sets; and
determine the maximum boundary corresponding to the first property as the minimum value of the disjoint sums.

9. The system of claim 1, wherein the processor is further configured to:
receive an update to a definition of the first property, wherein the update comprises to add a new resource to the first property; and
determine a new set of shared resources between the first property and the second property based at least in part on the updated definition of the first property.

10. The system of claim 1, wherein the processor is further configured to:
receive an update to a definition of the first property, wherein the update comprises to remove an existing resource to the first property; and
determine a new set of shared resources between the first property and the second property based at least in part on the updated definition of the first property.

11. The system of claim 1, wherein the processor comprises to:
receive a request for the estimated aggregate count of unique resource users corresponding to the first property; and
in response to the request, return the corrected estimated aggregate count of unique resource users corresponding to the first property.

12. A method, comprising:
determining, using a processor, a set of shared resources between a first property and a second property, wherein the first property comprises a custom property comprising a configurable collection of two or more resources;
recording, using the processor, a hidden node in a hierarchical graph corresponding to the first property and the second property as a parent node to the set of shared resources, wherein the hidden node represents a degree of overlap among estimated unique resource users corresponding to respective ones of the set of shared resources;
obtaining, using the processor, an estimated aggregate count of unique resource users corresponding to the first property, wherein the estimated aggregate count of unique resource users is determined based at least in part on an estimated sampling rate associated with one or more samples of a plurality of recorded user activities;
obtaining, using the processor, an estimated deduplicated count of unique resource users across the set of shared resources based on respective resource-specific estimated deduplicated counts of unique resource users corresponding to each shared resource in the set of shared resources, wherein the estimated deduplicated count of unique resource users corresponds to the hidden node in the hierarchical graph;

determining, using the processor, a minimum boundary and a maximum boundary corresponding to the first property based at least in part on the estimated deduplicated count of unique resource users corresponding to the hidden node; and correcting, using the processor, the estimated aggregate count of unique resource users corresponding to the first property based at least in part on the minimum boundary and the maximum boundary, including by:

in response to a determination that the estimated aggregate count of unique resource users corresponding to the first property is outside of the minimum boundary and the maximum boundary, adjusting the estimated aggregate count of unique resource users corresponding to the first property to a value within the minimum boundary and the maximum boundary.

13. The method of claim 12, further comprising:

comparing first resources belonging to the first property to second resources belonging to the second property;

determining a pairwise overlap weight based on the comparison; and determining that the set of shared resources exists based on the pairwise overlap weight.

14. The method of claim 12, further comprising generating a bipartite graph based at least in part on the first property and the second property, wherein the bipartite graph comprises the set of shared resources as descendant nodes to the hidden node.

15. The method of claim 14, further comprising converting the bipartite graph into the hierarchical graph, wherein the hierarchical graph comprises the hidden node as a child node to both the first property and the second property.

16. The method of claim 15, wherein the minimum boundary corresponding to the first property is determined as the maximum value of the estimated counts of unique resource users corresponding to the respective ones of the set of shared resources.

17. The method of claim 15, wherein the maximum boundary corresponding to the first property is determined including:

determining disjoint sets corresponding to the first property in the hierarchical graph;

determining corresponding disjoint sums corresponding to the disjoint sets; and determining the maximum boundary corresponding to the first property as the minimum value of the disjoint sums.

18. A computer program product, the computer program product being embodied in a non-transitory computer readable storage medium and comprising instructions for:

determining, using a processor, a set of shared resources between a first property and a second property, wherein the first property comprises a custom property comprising a configurable collection of two or more resources;

recording, using the processor, a hidden node in a hierarchical graph corresponding to the first property and the second property as a parent node to the set of shared resources, wherein the hidden node represents a degree of overlap among estimated unique resource users corresponding to respective ones of the set of shared resources;

obtaining, using the processor, an estimated aggregate count of unique resource users corresponding to the first property, wherein the estimated aggregate count of unique resource users is determined based at least in part on an estimated sampling rate associated with one or more samples of a plurality of recorded user activities;

obtaining, using the processor, an estimated deduplicated count of unique resource users across the set of shared resources based on respective resource-specific estimated deduplicated counts of unique resource users corresponding to each shared resource in the set of shared resources, wherein the estimated deduplicated count of unique resource users corresponds to the hidden node in the hierarchical graph;

determining, using the processor, a minimum boundary and a maximum boundary corresponding to the first property based at least in part on the estimated deduplicated count of unique resource users corresponding to the hidden node; and correcting, using the processor, the estimated aggregate count of unique resource users corresponding to the first property based at least in part on the minimum boundary and the maximum boundary, including by:

in response to a determination that the estimated aggregate count of unique resource users corresponding to the first property is outside of the minimum boundary and the maximum boundary, adjusting the estimated aggregate count of unique resource users corresponding to the first property to a value within the minimum boundary and the maximum boundary.

* * * * *